United States Patent
Yoshii et al.

(10) Patent No.: US 10,891,329 B2
(45) Date of Patent: Jan. 12, 2021

(54) IMAGE RECOGNITION METHOD AND IMAGE RECOGNITION APPARATUS

(71) Applicant: CANON KABUSHIKI KAISHA, Tokyo (JP)

(72) Inventors: Hiroto Yoshii, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 15/826,396

(22) Filed: Nov. 29, 2017

(65) Prior Publication Data
US 2018/0089187 A1 Mar. 29, 2018

Related U.S. Application Data

(63) Continuation of application No. 13/375,448, filed as application No. PCT/JP2010/060413 on Jun. 15, 2010, now Pat. No. 9,852,159.

(30) Foreign Application Priority Data

Jun. 18, 2009 (JP) .................................. 2009-145457
Mar. 19, 2010 (JP) .................................. 2010-064316

(51) Int. Cl.
*G06F 16/51* (2019.01)
*G06T 7/33* (2017.01)
(Continued)

(52) U.S. Cl.
CPC ........... *G06F 16/51* (2019.01); *G06K 9/4642* (2013.01); *G06K 9/6202* (2013.01);
(Continued)

(58) Field of Classification Search
CPC . G06T 2207/20021; G06T 2207/20081; G06T 7/337; G06K 9/6282;
(Continued)

(56) References Cited

U.S. PATENT DOCUMENTS

| 4,682,365 A | 7/1987 | Orita et al. ..................... 382/14 |
| 5,754,686 A | 5/1998 | Harada et al. ................ 382/187 |

(Continued)

FOREIGN PATENT DOCUMENTS

| CN | 101196992 | 6/2008 |
| CN | 101275852 | 10/2008 |

(Continued)

OTHER PUBLICATIONS

David Demirdjian, et al: "Patch-Based Pose Inference with a Mixture of Density Estimators", Oct. 20, 2007 (Oct. 20, 2007), Analysis and Modeling of Faces and Gestures; [Lecture Notes in Computer Science], Springer Berlin Heidelberg, Berlin, Heidelberg, pp. 96-108, XP019081572, ISBN: 978-3-540-75689-7.

(Continued)

*Primary Examiner* — Kenny A Cese
(74) *Attorney, Agent, or Firm* — Venable LLP

(57) ABSTRACT

An image recognition apparatus is provided which comprises a first extracting means for extracting, from every registration image previously registered, a set of registration partial images of a predetermined size, and a second extracting means for extracting, from an input new image, a set of new partial images of a predetermined size. The apparatus further comprises a discriminating means for discriminating an attribute of the new partial image based on a rule formed by dividing the set of the registration partial images extracted by the first extracting means, and a collecting means for deriving a final recognition result of the new image by collecting discrimination results by the discriminating means at the time when the new partial images as elements of the set of the new partial images are input.

20 Claims, 15 Drawing Sheets

(51) Int. Cl.
*G06K 9/62* (2006.01)
*G06K 9/46* (2006.01)
(52) U.S. Cl.
CPC ......... *G06K 9/6255* (2013.01); *G06K 9/6282* (2013.01); *G06K 9/6292* (2013.01); *G06T 7/337* (2017.01); *G06T 2207/20021* (2013.01); *G06T 2207/20081* (2013.01)
(58) Field of Classification Search
CPC .......... G06K 9/00536; G06K 9/00288; G06K 9/4642; G06K 9/6202; G06K 9/6292; G06K 9/6255; G06F 16/51
See application file for complete search history.

(56) References Cited

U.S. PATENT DOCUMENTS

| | | | |
|---|---|---|---|
| 5,781,663 A | 7/1998 | Sakaguchi et al. | 382/189 |
| 5,835,632 A | 11/1998 | Takasu et al. | 382/185 |
| 5,982,933 A | 11/1999 | Yoshii et al. | 382/226 |
| 6,035,062 A | 3/2000 | Takasu et al. | 382/187 |
| 6,052,482 A | 4/2000 | Arai et al. | 382/187 |
| 6,208,755 B1 | 3/2001 | Mori et al. | 382/187 |
| 6,212,298 B1 | 4/2001 | Yoshii et al. | 382/193 |
| 6,233,352 B1 | 5/2001 | Yoshii | 382/157 |
| 6,285,780 B1 * | 9/2001 | Yamakita | A01K 11/006 382/110 |
| 6,373,473 B1 | 4/2002 | Sakaguchi et al. | 345/173 |
| 6,421,461 B1 | 7/2002 | Arai et al. | 382/187 |
| 6,477,272 B1 * | 11/2002 | Krumm | G06K 9/4652 382/170 |
| 6,647,139 B1 * | 11/2003 | Kunii | G06K 9/00791 382/159 |
| 6,671,403 B1 | 12/2003 | Takasu et al. | 382/187 |
| 6,999,623 B1 | 2/2006 | Yamaoka et al. | 382/209 |
| 7,039,233 B2 | 5/2006 | Mori et al. | 382/181 |
| 7,054,850 B2 | 5/2006 | Matsugu | 706/48 |
| 7,274,819 B2 | 9/2007 | Matsugu | 382/181 |
| 7,577,297 B2 | 8/2009 | Mori et al. | 382/190 |
| 7,881,524 B2 | 2/2011 | Matsugu et al. | 382/156 |
| 7,912,253 B2 | 3/2011 | Suzuki et al. | 382/118 |
| 7,995,805 B2 | 8/2011 | Suzuki et al. | 382/118 |
| 8,548,260 B2 | 10/2013 | Okaka | 382/226 |
| 8,624,994 B2 | 1/2014 | Kaneda et al. | 348/222.1 |
| 8,755,611 B2 | 6/2014 | Tate et al. | 328/218 |
| 8,768,944 B2 | 7/2014 | Yoshii et al. | 707/758 |
| 8,930,286 B2 | 1/2015 | Yoshii | 706/12 |
| 9,245,198 B2 | 1/2016 | Mitarai et al. | G06K 9/4604 |
| 2002/0090133 A1 | 7/2002 | Kim et al. | 382/164 |
| 2003/0161504 A1 | 8/2003 | Inoue | 382/115 |
| 2004/0062435 A1 * | 4/2004 | Yamaoka | G06K 9/4609 382/159 |
| 2004/0205038 A1 | 10/2004 | Lee et al. | 706/47 |
| 2005/0164217 A1 | 7/2005 | Yoshii | 435/6 |
| 2006/0074653 A1 | 4/2006 | Mitari et al. | 704/240 |
| 2006/0110029 A1 | 5/2006 | Kazui et al. | 382/159 |
| 2006/0115157 A1 | 6/2006 | Mori et al. | 382/190 |
| 2006/0285596 A1 | 12/2006 | Kondo et al. | 375/240 |
| 2007/0127816 A1 | 6/2007 | Balslev et al. | 382/181 |
| 2007/0201739 A1 | 8/2007 | Nakagaki et al. | 382/149 |
| 2007/0217688 A1 | 9/2007 | Sabe et al. | 382/226 |
| 2008/0008349 A1 | 1/2008 | Binnig et al. | 382/100 |
| 2008/0075367 A1 | 3/2008 | Winn et al. | 382/180 |
| 2008/0080769 A1 | 4/2008 | Kanatsu | 382/176 |
| 2008/0137917 A1 | 6/2008 | Okubo et al. | 382/118 |
| 2008/0240506 A1 | 10/2008 | Nakamura et al. | 382/104 |
| 2008/0279460 A1 | 11/2008 | Kasahara et al. | 382/224 |
| 2008/0285809 A1 | 11/2008 | Abe et al. | 382/107 |
| 2008/0309662 A1 * | 12/2008 | Hassner | G06K 9/20 345/419 |
| 2008/0319932 A1 | 12/2008 | Yih et al. | 706/20 |
| 2009/0087123 A1 | 4/2009 | Izawa et al. | 382/284 |
| 2009/0092336 A1 * | 4/2009 | Tsurumi | G06K 9/3216 382/294 |
| 2009/0208106 A1 | 8/2009 | Dunlop et al. | 382/173 |
| 2009/0219405 A1 | 9/2009 | Kaneda et al. | 348/222.1 |
| 2009/0220155 A1 | 9/2009 | Yamamoto et al. | 382/190 |
| 2009/0316988 A1 | 12/2009 | Xu et al. | 382/173 |
| 2009/0324060 A1 | 12/2009 | Sato et al. | 382/159 |
| 2010/0027892 A1 | 2/2010 | Guan et al. | 382/203 |
| 2010/0092093 A1 | 4/2010 | Akatsuka et al. | 382/203 |
| 2010/0142807 A1 | 6/2010 | Yasuda et al. | 382/164 |
| 2010/0329556 A1 | 12/2010 | Mitarai et al. | 382/170 |
| 2011/0158535 A1 | 6/2011 | Iio et al. | 382/190 |
| 2012/0033853 A1 | 2/2012 | Kaneda et al. | 382/103 |

FOREIGN PATENT DOCUMENTS

| | | |
|---|---|---|
| EP | 1536369 | 6/2005 |
| EP | 1 587 024 | 10/2005 |
| EP | 2 040 221 | 3/2009 |
| JP | 09-021610 | 1/1997 |
| JP | 11-312248 | 11/1999 |
| JP | 2002-032766 | 1/2002 |
| JP | 2006-065447 | 3/2006 |
| JP | 2006-146626 | 6/2006 |
| JP | 2008-282267 | 11/2008 |
| JP | 2010-045613 | 2/2010 |
| WO | 2008/100248 | 8/2008 |

OTHER PUBLICATIONS

"Chapter 4. "Nonparametric techniques"" In: R. Duda, P. Hart, D. Stork: "Pattern Classification", 2001, John Wiley & Sons, XP002780088, pp. 161-172.

Extended European Search Report dated May 2, 2018 in counterpart European Application No. 10789600.3.

Notice of Allowance in Chinese Application No. 201080026084.6.

Chinese Office Action dated Aug. 29, 2013 in Chinese Application No. 201080026084.6.

Chinese Office Action dated May 16, 2014 in Chinese Patent Application No. 201080026084.6.

Chinese Office Action dated Jan. 23, 2015 corresponding to Chinese Application No. 2010-80026084.6.

Japanese Office Action dated Jan. 13, 2015 in Japanese Application No. 2014-089310.

J. Shotton, et al., "Semantic Texton Forests for Image Categorization and Segmentation", IEEE, pp. 1-8 (2008).

Zhuowen Tu, "Probabilistic Boosting-Tree: Learning Discriminative Models for Classification, Recognition, and Clustering", IEEE, vol. 2, pp. 1589-1596 (2005).

F. Moosmann, et al., "Randomized Clustering Forests for Image Classification", IEEE, vol. 30, No. 9, pp. 1632-1646 (2008).

European Search Report dated Oct. 20, 2017 in European Application No. 10789600.3.

International Preliminary Report on Patentability dated Jan. 5, 2012 in PCT Patent Application No. PCT/JP2010/060413.

International Search Report dated Jul. 20, 2010 in PCT Patent Application No. PCT/JP2010/060413.

* cited by examiner

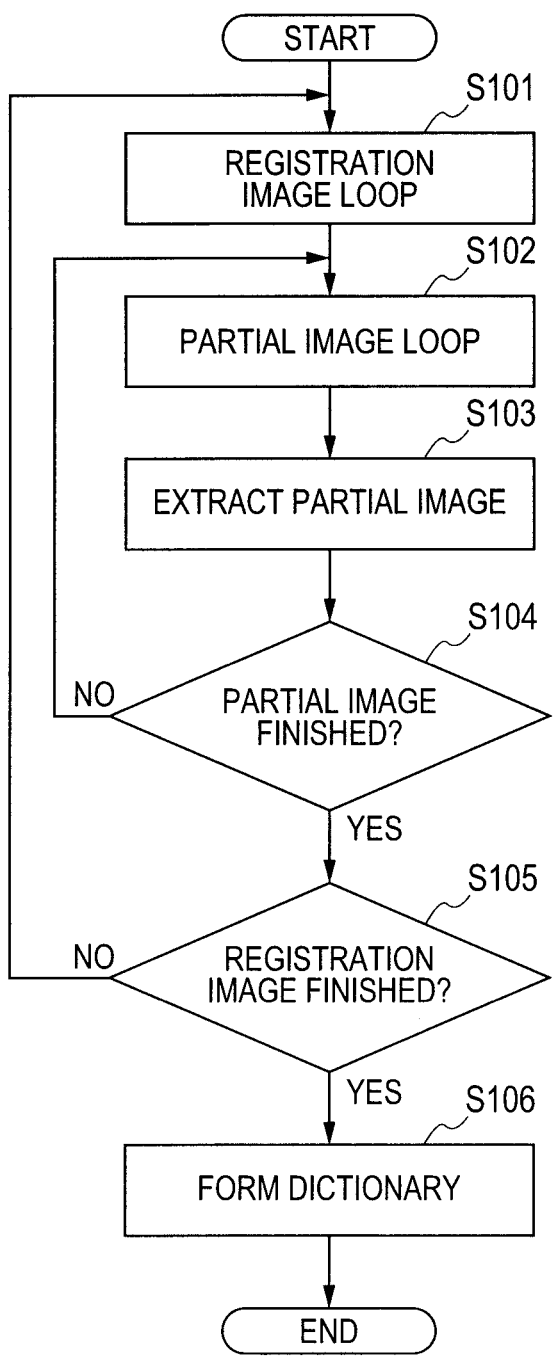
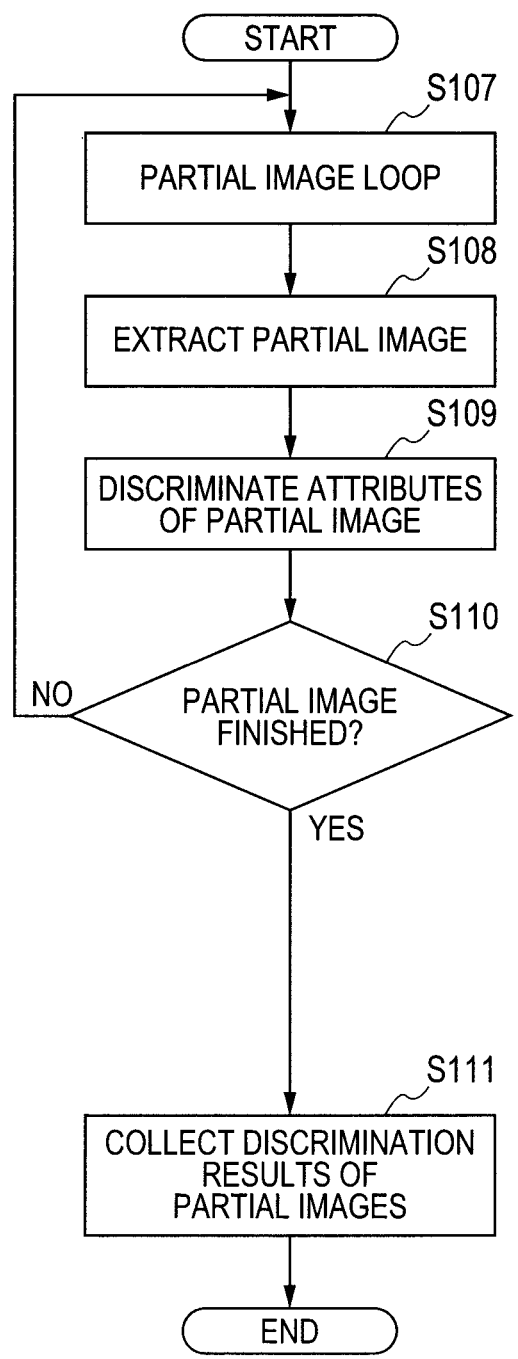

IMAGE RECOGNITION METHOD AND IMAGE RECOGNITION APPARATUS

This application is a continuation of U.S. patent application Ser. No. 13/375,448 filed Nov. 30, 2011, currently pending, which is a § 371 National Stage of International Application No. PCT/JP2010/060413 filed Jun. 15, 2010; and claims priority under 35 U.S.C. § 119 to Japanese Application 2009-145457 filed in Japan on Jun. 18, 2009, and Japanese Application 2010-064316 filed in Japan on Mar. 19, 2010. The contents of each of the foregoing applications are incorporated herein by reference as if set forth in full.

TECHNICAL FIELD

The invention relates to an image recognition method of presuming information such as name, type, existence position, orientation, and the like of a target by using a photograph image of the target. The "target" mentioned here denotes an arbitrary object and may be any one of, for example, a human, an animal, an automobile, a camera, a printer, a semiconductor substrate, and the like.

BACKGROUND ART

In recent years, there has been a method of presuming a type and an existence area of a target object by pattern matching an image of the target object which has preliminarily been learned and an image including a target object which was newly photographed (for example, refer to the Official Gazette of Japanese Patent Application Laid-Open No. 2002-32766). In the above method, an eigen value and an eigen vector are calculated from the image of the target object which has preliminarily been learned and registered. Such a device that the target object can be recognized by the smaller number of models by projecting an image cut out from the newly photographed image to its eigen vector has been made. A device to further raise a recognition rate by using partial learning images which are obtained by dividing the image of the target object which has preliminarily been learned and registered has also been disclosed.

However, according to the pattern matching method of the image represented by the foregoing method, there is such a problem that it takes a long time to recognize. Particularly, if the number of classes to be discriminated is very large, there is such a problem that a recognition time explodes. For example, it is now assumed that there are 1000 kinds of target objects (for example, faces of 1000 persons are registered) and there are 100 (also including a profile and the like) learning images (per object) photographed from various angles for each target object. Thus, 100000 learning patterns exist in total. Consequently, even if an image collation of one registration image and the new photograph image can be made for 10 nsec, one second is required to obtain a final recognition result.

As for the registration image mentioned here, for example, an inside of a circumscribed rectangle surrounding the target object is presumed. As for the new photograph image, an image of a large size including the registration image is presumed. Therefore, the image collation of one registration image and the new photograph image is not a simple image pattern matching of a one-to-one correspondence relationship but includes a position specifying task for specifying in which portion in the new photograph image the target object exists. Specifically speaking, for example, by cutting out the new photograph image by a sliding window and matching each cut-out image and the registration image, the image collation is realized. Therefore, although it depends on the number of pixels of each of the registration image and the new photograph image, the foregoing image collating time of 10 nsec can be regarded as a time obtained in the case where the images have been processed at a very high speed in terms of a current computer processing speed.

Further, in the related art, according to the image matching method using the partial learning images mentioned above, such a problem that the recognition time explodes appears typically. For example, now assuming that one learning image was divided into 100 (=10×10) overlap partial images, since the number of registration images to be matched is increased 100 times, a calculating time is also simply increased 100 times. In the case of the foregoing example, a time of 100 seconds is required.

Even if the number of dimensions was reduced by using the eigen vector by the foregoing method, although the calculating time of the distance calculation can be reduced, since a vector calculation adapted to reduce the number of dimensions cannot be omitted, a high speed of the total image recognition cannot be eventually realized. Such an essential problem that the image collation of the same number of times as the number of kinds of registration images is necessary is not solved at all.

DISCLOSURE OF INVENTION

According to one aspect of the present invention, an image recognition method is provided which comprises: a first extracting step of extracting, from every registration image which is previously registered, a set of registration partial images of a predetermined size; a second extracting step of extracting, from an input new image, a set of new partial images of a predetermined size; a discriminating step of discriminating an attribute of the new partial image based on a rule which is formed by dividing the set of the registration partial images extracted in the first extracting step; and a collecting step of deriving a final recognition result of the new image by collecting discrimination results in the discriminating step at the time when the new partial images as elements of the set of the new partial images are input.

Further features and aspects of the present invention will become apparent from the following detailed description of exemplary embodiments with reference to the attached drawings.

BRIEF DESCRIPTION OF THE DRAWINGS

FIGS. 2A and 2B are flowcharts illustrating a processing procedure of an image recognition method of the embodiment.

BEST MODE FOR CARRYING OUT THE INVENTION

Embodiments of the invention will be described hereinbelow with reference to the accompanying drawings.

Figure 1:
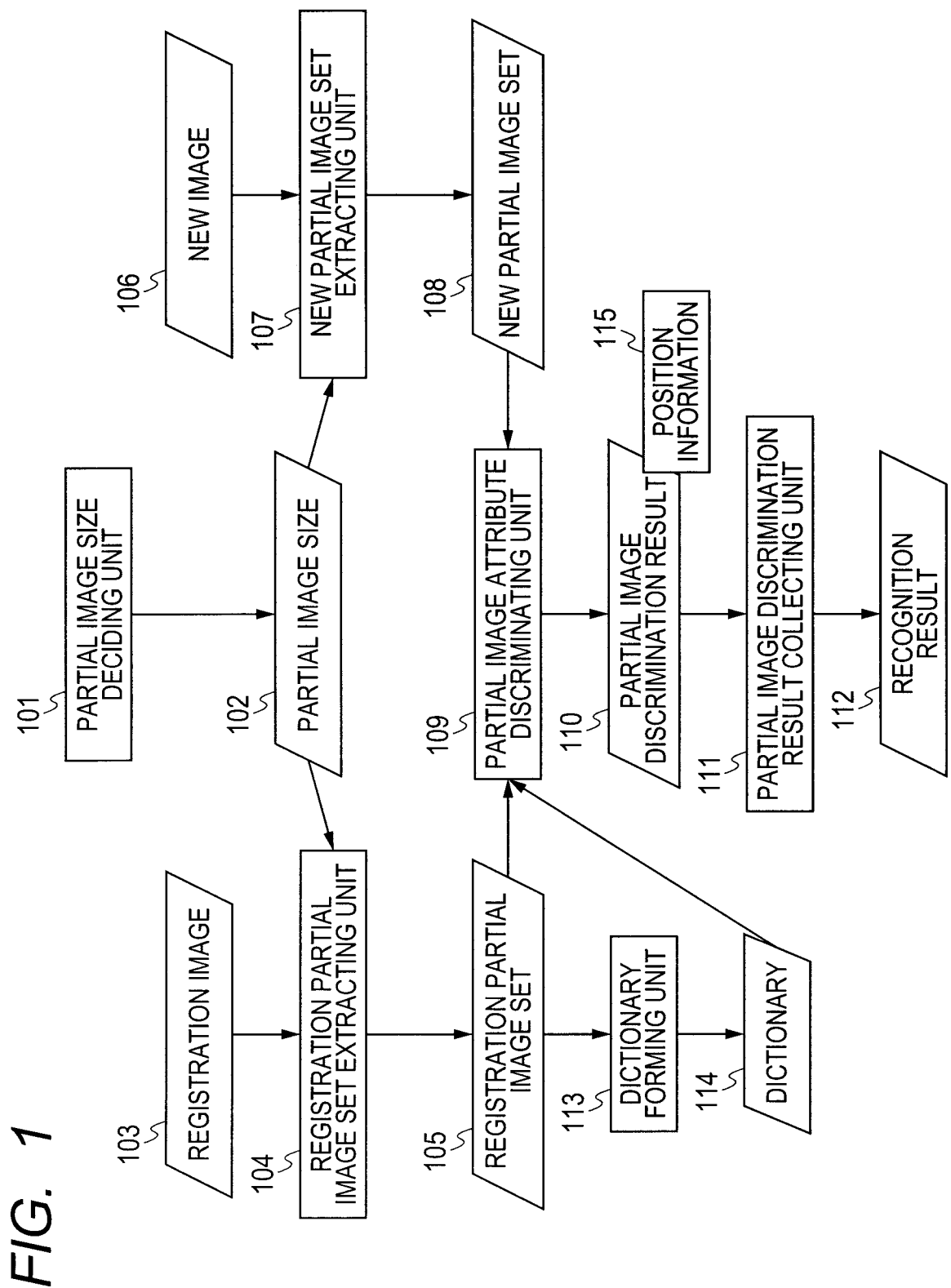
FIG. 1 is a diagram illustrating a processing construction of an image recognition apparatus of an embodiment.

FIG. 1 is a diagram for describing a fundamental processing construction of an image recognition apparatus according to the embodiment. FIGS. 2A and 2B are flowcharts illustrating a processing procedure of an image recognition method according to the embodiment.

First, a size 102 of a partial image to be cut out is preliminarily decided in a partial image size deciding unit 101. Details of processing contents of the partial image size deciding unit 101 will be described in the fourth embodiment. It is now assumed that the proper partial image size 102 is preliminarily decided by the partial image size deciding unit 101.

In the case of registering an image serving as a comparison target at the time of recognition, a registration partial image set 105 is extracted from a registration image 103 by a registration partial image set extracting unit 104 serving as first extracting means based on the partial image size 102. Assuming that the number of extracted registration partial image sets 105 is equal to M every registration image and the number of registration images is equal to N, the number of all extracted registration partial image sets 105 is equal to N×M. Further, a dictionary 114 for recognition is formed by a dictionary forming unit 113 from the registration partial image sets 105. A process to form the dictionary 114 for recognition is not indispensable but the registration partial image sets 105 may be used as they and recognized.

On the other hand, in the case of recognizing a new image, a new partial image set 108 of the partial image size 102 is extracted from a new image 106 by a new partial image set extracting unit 107 serving as second extracting means. In a partial image attribute discriminating unit 109, attributes of each of the new partial images constructing the new partial image set 108 are discriminated based on the registration partial image sets 105 which have already been extracted or based on the dictionary 114 formed therefrom.

Finally, discrimination results 110 of the new partial images as elements of the new partial image set 108 are collected by a partial image discrimination result collecting unit 111, so that a final recognition result 112 is obtained. In the first embodiment, the partial image discrimination result 110 is only a discrimination result of the attribute. However, in the second embodiment, position information 115 showing a position in the image of the partial image is included in the partial image discrimination result 110. Details will be described in the second embodiment.

It is assumed that the number of partial images constructing the new partial image set 108 extracted by the new partial image set extracting unit 107 is equal to K. At this time, if a process called "template matching" as represented in Patent Document 1 is used in the partial image attribute discriminating unit 109, it is necessary to execute the collating process N×M×K times in total. At this time, the registration partial image set 105 is used in the partial image attribute discriminating unit 109.

On the other hand, in the method shown in the embodiment, the number of processing times can be reduced to K times by using what is called a machine learning. At this time, the dictionary 114 is used in the partial image attribute discriminating unit 109.

Generally, a relation between constants M and K described above is M≠K. However, if a size of registration image and a size of new image are equal, for example, if all of the partial images included in each image are used, the relation of M=K is satisfied. A case where the size of registration image and the size of new image are different will be described in detail in the third embodiment.

The partial image discrimination result collecting unit 111 will be more specifically described. "Attribute" denotes N-dimensional probability vectors of (p1, p2, . . . , pN). Pi denotes a probability in which the new partial image is included in the i-th registration image. If the new partial image set 108 is constructed by the K partial images, K N-dimensional probability vectors exist. The final recognition result 112 becomes an index of the registration image showing the maximum probability among the average probabilities obtained by executing a process in which an arithmetic mean of those K probability vectors is simply calculated, a process in which an arithmetic mean after logarithms of them were obtained is calculated (corresponding to a geometric mean in which K probabilities are multiplied), or the like.

FIG. 2A is a flowchart at the time of learning and FIG. 2B is a flowchart at the time of discrimination.

At the time of learning, a loop of steps S101 to S105 is executed with respect to each of the registration images, a loop of steps S102 to S104 is executed with respect to each of the partial images in each registration image, and the registration partial image set 105 is formed. A loop of the registration images of steps S101 to S105 is executed N times, a loop of the partial images of steps S102 to S104 is executed M times, and the extraction of the partial images of step S103 is executed N×M times.

In the image recognition method of the embodiment, desirably, the dictionary 114 is formed from the registration partial image sets 105 in step S107. However, the embodiment is not limited to the method of using the mechanism of what is called a machine learning but the image matching may be performed by using the registration partial image sets 105 as they are.

FIG. 2B is the flowchart at the time of the discrimination. First, a loop (S107 to S110) for discriminating the attribute of the partial image is executed while the partial images included in the new image are extracted from the new image. This loop is executed K times. The partial images which are extracted in step S108 are partial images in one new image constructing the new partial image set 108.

In step S110, the partial image discrimination result 110 is derived from the new partial image by using the registration partial image set 105 or the dictionary 114.

In step S111, the partial image discrimination results 110 are collected and the final recognition result 112 is derived.

Figure 3:
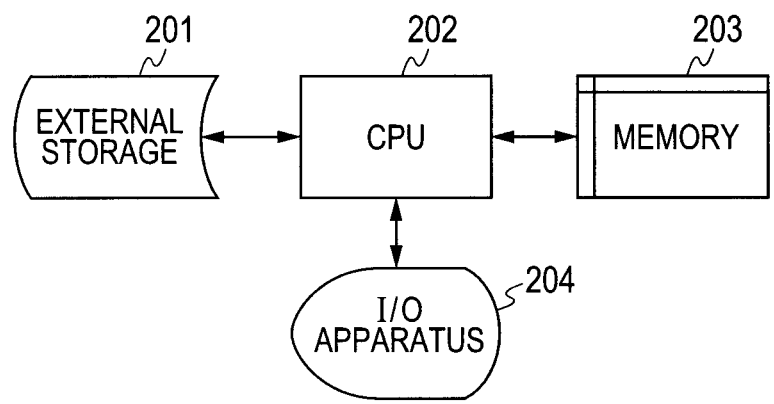
FIG. 3 is a diagram illustrating an example of a hardware construction of an information processing apparatus.

FIG. 3 is a block diagram illustrating a construction of an information processing apparatus in which the image recognition methods according to all embodiments including the present embodiment are executed.

The image recognition method is installed into an apparatus having an external storage device 201, a central processing unit (CPU) 202, a memory 203, and an input/output apparatus 204. The external storage device 201 stores a program for realizing processes in the embodiment, registration images photographed by a camera, the dictionary 114 formed by using the registration images, and the like. The external storage device 201 also has a function for holding a recognition result of the target object derived by the embodiment. The CPU 202 executes the program of the image recognition method and controls each unit of the apparatus. The memory 203 temporarily stores the program which is used by the CPU 202, subroutines, and data. The input/output apparatus 204 fetches images from the camera, makes an interaction with the user, or outputs an image recognition result to another information processing apparatus. Although the camera is generally used as an input apparatus, an apparatus such as a scanner can be used. There is also a case where the user issues, through the input/output apparatus, a trigger for executing the program to realize the image recognition method of the embodiment. There is also a case where the user sees the result or controls parameters of the program through the input/output apparatus. There can also be a case of an apparatus for controlling a robot as an output destination.

Figure 4:
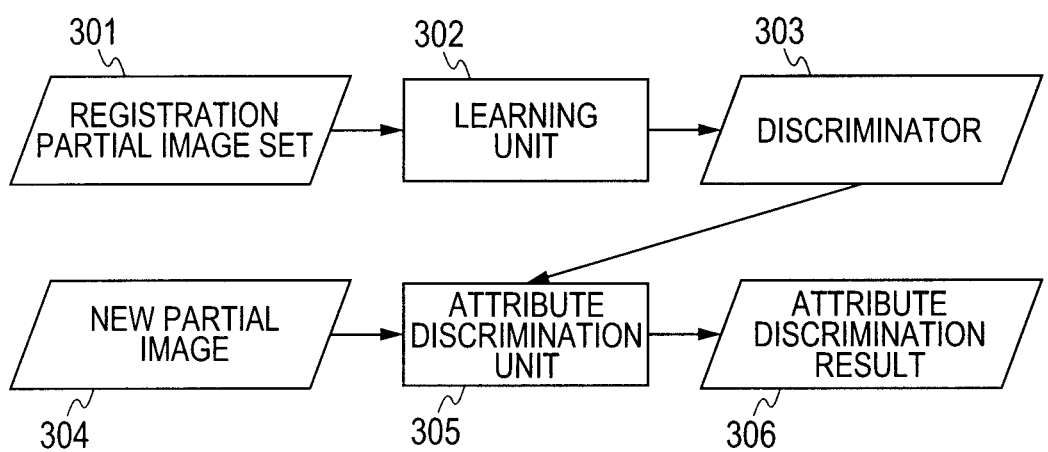
FIG. 4 is a diagram for describing a partial image attribute discriminating step.

A process of the partial image attribute discriminating unit 109 will be described in detail by using FIG. 4. In the image recognition method of the embodiment, the method of what is called a machine learning is presumed. In this case, the process of the partial image attribute discriminating unit 109 is divided into two phases of a learning phase and a recognition phase.

In the learning phase, a discriminator 303 is formed from a registration partial image set 301 by a learning unit 302. In the discriminator 303, an algorithm which is generally used in the machine learning such as neural network or support vector machine can be used. More desirably, a method using a set of classification trees, which will be mentioned in FIG. 6 and subsequent diagrams, can be used.

The discriminator 303 makes a discrimination according to the attributes of the partial image and its substance is internal parameters after the learning of the adopted algorithm. Specifically speaking, in the case of the neural net, the internal parameters are a set of weights of all connections, and in the case of the support vector machine, they are a set of all support vectors. In the case of the classification trees, a set of discrimination parameters in each internal node of a tree structure and a set of class existence probabilities in each terminal node become the internal parameters. The internal node mentioned here denotes a node having child nodes. The terminal node mentioned here denotes an end node having no child nodes.

In the recognition phase, in an attribute discriminating unit 305, a new partial image extracted from a new image is discriminated by using the discriminator 303, thereby obtaining an attribute discrimination result 306. A new partial image 304 corresponds to each element constructing the new partial image set 108 in FIG. 1. The attribute discrimination result 306 corresponds to the partial image discrimination result 110 in FIG. 1.

Although an expression "attribute discrimination" has been used in the attribute discriminating unit 305 in FIG. 3, it is ordinarily called "recognition" in the field of the machine learning. This is because in the attribute discriminating unit 305, the new partial image and the registration partial image are not collated one by one but a degree of similarity of the new partial image to the registration partial image is derived based on the discriminator 303 in which information of all of the learned registration partial image groups has been stored.

In the embodiment, there are a plurality of new partial images 304 and there are also a plurality of attribute discrimination results 306. By collecting them in the partial image discrimination result collecting unit 111 in FIG. 1, the final recognition result 112 is obtained. The reason why the expression "recognition" is not purposely used in the attribute discriminating unit 305 is that it is intended to emphasize a point that the final recognition result is not obtained.

According to the pattern matching method in the related art, in the attribute discriminating unit 305, processes of every all combinations of the registration partial image set 105 and the new partial image set 108 are necessary. On the other hand, in the embodiment, the processes of the number of times as many as the number of elements of the new partial image set 108 are fundamentally necessary.

Subsequently, the registration partial image set 105 will be described by using FIG. 5. M partial images are extracted from one registration image (learning image). They are called a partial image set. Although the partial images constructing the partial image set do not necessarily overlap, it is desirable that they are comprehensively extracted from the original learning image so as to overlap.

For example, it is assumed that a size of learning image is equal to 100×100 pixels and a size of partial image is equal to 50×50 pixels. Now, assuming that an intermediate position (what is called a subpixel) between the pixels is not considered, the number of all partial images which are extracted from one learning image is equal to 2601 (=51× 51). Now, assuming that the non-overlapped partial images were extracted, 4 (=2×2) partial images are obtained in total.

It is desirable that the partial image set is constructed by many partial images as large as possible (for example, the half or more) included in all of 2601 partial images. As a final learning (registration) partial image group, every M registration partial images tagged to the same class (=synonymous with the index of the registration image) are obtained, that is, M×N learning partial images are obtained in total.

Figure 6:
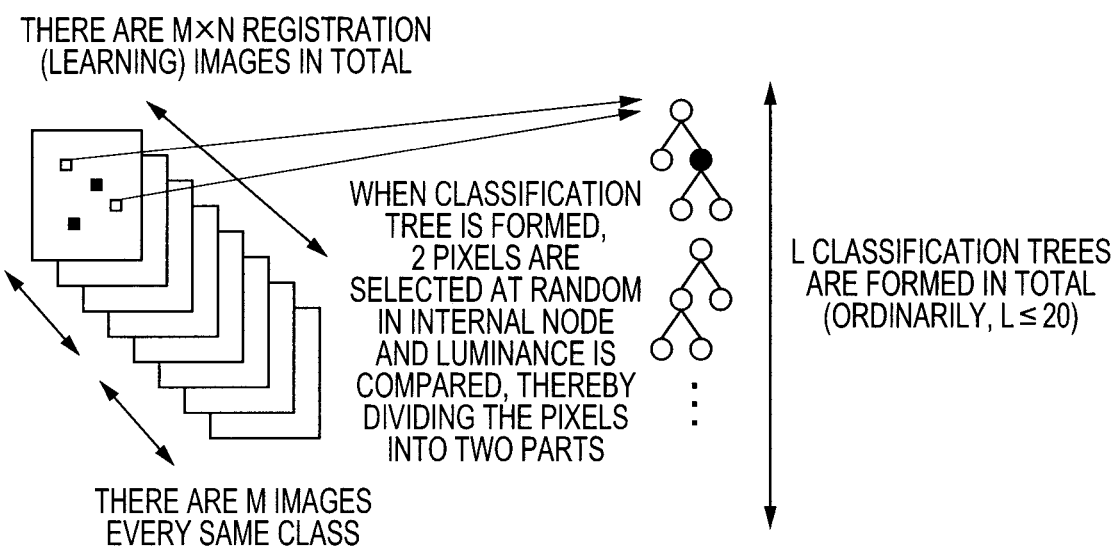
FIG. 6 is a diagram schematically illustrating a learning step.

Subsequently, a learning algorithm will be described. FIG. 6 is a diagram schematically illustrating a process of the learning unit 302. A process of the attribute discriminating unit 305 will be also described by using the same diagram.

In the learning of the embodiment, L discriminators of the tree structure called a classification tree are formed. Although L may be equal to 1, a number in a range from 10 to 30 is desirable. The classification tree is constructed by the internal node and the terminal node. In the internal node, a discriminating expression, a discriminating rule, or a discriminating routine to discriminate to which child node a process advances exists. In the terminal node, an existence probability of the class as a recognition target has been held.

Figure 5:
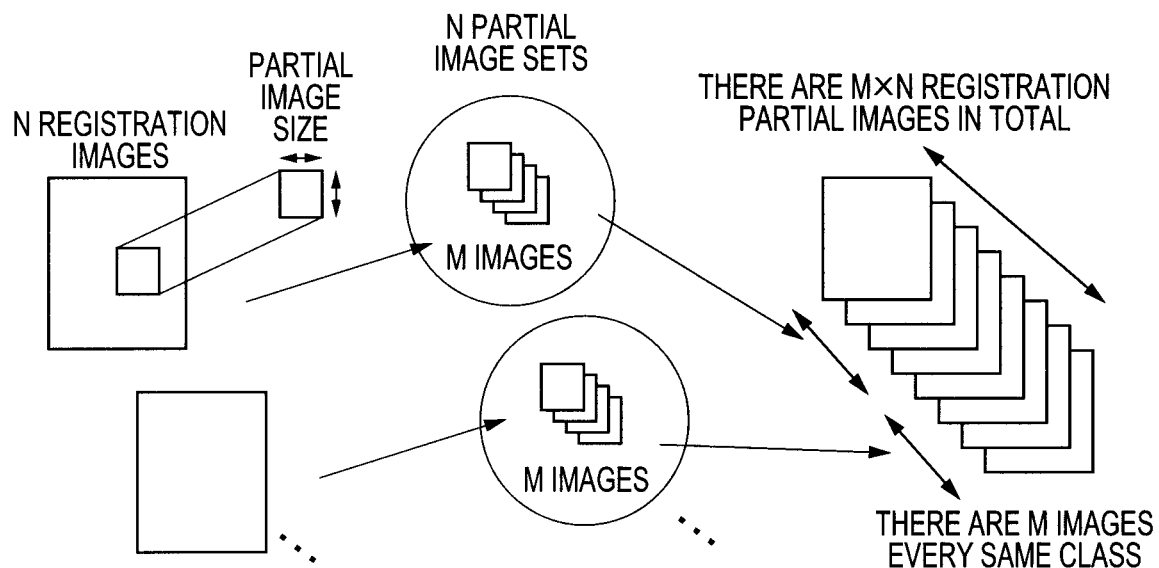
FIG. 5 is a diagram for describing a registration partial image group.

In the learning phase, bisection trees are formed by using the learning partial image groups illustrated in FIG. 5. Since L classification trees exist in total, the formation of the classification tree is executed L times. When the classification trees are formed, in the internal node of each classification tree, two pixels are selected at random and luminance of the pixels is compared, thereby dividing the set of the partial images included in the learning partial image group into two parts. The above processes will be described in detail hereinafter by using FIG. 7.

Although the two pixels have been selected at random in the embodiment, it is also possible to construct in such a manner that two arbitrary rectangular areas in the partial image are selected at random and average luminance of the rectangular areas is compared, thereby executing a branching process. It is also possible to construct in such a manner that a plurality of prepared mask patterns instead of the rectangles are used, two arbitrary kinds of mask patterns existing at arbitrary positions in the partial image are selected at random and average luminance of the areas is compared, thereby executing the branching process.

In the attribute discriminating unit 305 for processing the new partial image by using the classification tree set, the process for tracing the classification trees are executed L times. As a result of tracing the classification trees with reference to the new partial image, the process finally reaches the terminal node L times. Assuming that there are N registration images, since N existence probability vectors ($p_1, p_2, \ldots, p_N$) have generally been stored in each terminal node, L probability vectors are eventually obtained. Finally, the average probability obtained by executing the process in which an arithmetic mean of those L probability vectors is simply calculated, a process in which an arithmetic mean after logarithms of them were obtained is calculated (corresponding to a geometric mean in which L probabilities are multiplied), or the like becomes a final output of the attribute discriminating unit 305 in the embodiment. As a method of fining the average probability, the probabilities other than the value of the highest probability may be set to 0. This corresponds to such a process that the class having the highest score by the voting of the recognition results of what are called L classification trees is set to a result of the attribute discriminating unit 305.

Subsequently, an order of a calculating time by the attribute discriminating unit 305 will be analyzed. Since the number L of classification trees mentioned above is a constant, it has no relation to the order of the calculating time. The calculating time is proportional to a depth of classification tree and its maximum value increases in proportion to the logarithms of the number as many as the number of images which are registered. That is, in the case of the image recognition method of the embodiment, even if the speed is slow, only the calculating time of the order of log (the number of registration partial images) is needed. On the other hand, in the image collating method in the related art as disclosed in Patent Document 1, a calculating time of the order of the number of registration partial images is necessary.

Figure 7:
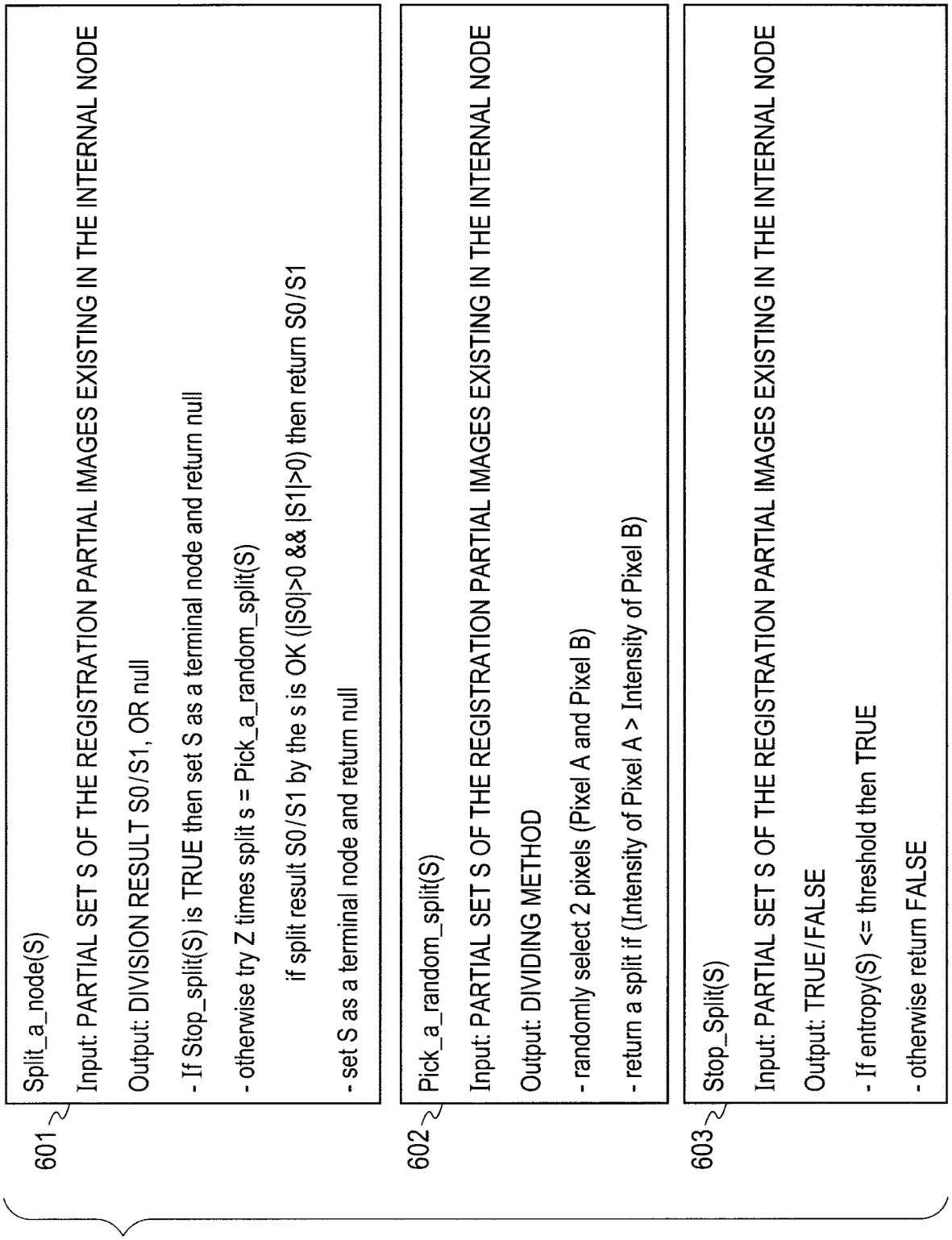
FIG. 7 is a diagram for describing specific processes of the learning step.

A specific process of the learning unit 302 will be described by using FIG. 7.

The formation of the classification trees is realized by recursively calling Split_a_node(S) of a subroutine 601. The subroutine Split_a_node(S) calls Pick_a_random_split(S) of a subroutine 602 and Stop_Split (S) of a subroutine 603.

The images existing in the top node (root node) of the classification tree are all of the registration partial images. Sat the time of calling Split_a_node(S) first becomes all of the registration partial images (the whole set is also a type of partial set).

Such a process that the subroutine 601 is recursively called denotes that as a result of Split_a_node(S), the set of the registration partial images is divided into two sets S0 and S1 and Split_a_node (S0) and Split_a_node (S1) are executed.

As contents of Split_a_node(S) of the subroutine 601, first, Split_a_node(S) is called and when a return value is TRUE, the node is set to the terminal node and the recursive call is finished. In the terminal node, the existence probability of the class is stored as described so far. The existence probability of the class is obtained by counting the number of classes of the registration images in S from S as an argument of the subroutine Split_a_node. For example, if only the partial images of a certain registration image are included in the set of the registration partial images of S, the probability of the class is equal to 1 and the probabilities of other classes are equal to 0.

Subsequently, if a return value of Stop_Split (S) is FALSE, Pick_a_random_split(S) is called Z times (for example, Z=1000). If the division serving as a return value of Pick_a_random_split(S) is OK, the processing loop is finished and the division is returned. The division is OK under a condition that one or more registration partial images are included in both of S0 and S1 (|S| denotes the number of elements included in the set S).

If the division of OK cannot be performed even after Pick_a_random_split(S) was tried Z times, the node is set to the terminal node and the recursive process is finished.

The Pick_a_random_split(S) routine selects two pixels in the image at random and compares their luminance as described in FIG. 6.

Stop_Split (S) of the subroutine 603 is a routine for discriminating whether or not the condition of the terminal node is satisfied. entropy(S) is an information entropy of the set S of the registration partial images. Assuming that the existence probabilities of the classes are ($p_1, p_2, \ldots, p_N$), entropy (S) is calculated by an expression $-\Sigma(p_i*\log (p_i))$. For example, assuming that S includes only the partial images included in a certain registration image, the entropy is equal to 0.

By changing a value of a threshold of Stop_Split (S), a reference adapted to discriminate a degree of pureness of the node at which it is set to the terminal node can be changed. For example, assuming that the threshold is equal to 0, only the partial images of a certain registration image are certainly included in the terminal node.

In the embodiment, it is also possible to construct in such a manner that the function Stop_Split (S) always returns TRUE. Thus, the recursive node formation (development) is not executed but a structure in which only the root node and its child nodes exist is formed.

Subsequently, the operation of Split_a_node(S) of the subroutine 601 will be described by using FIG. 8.

Figure 8:
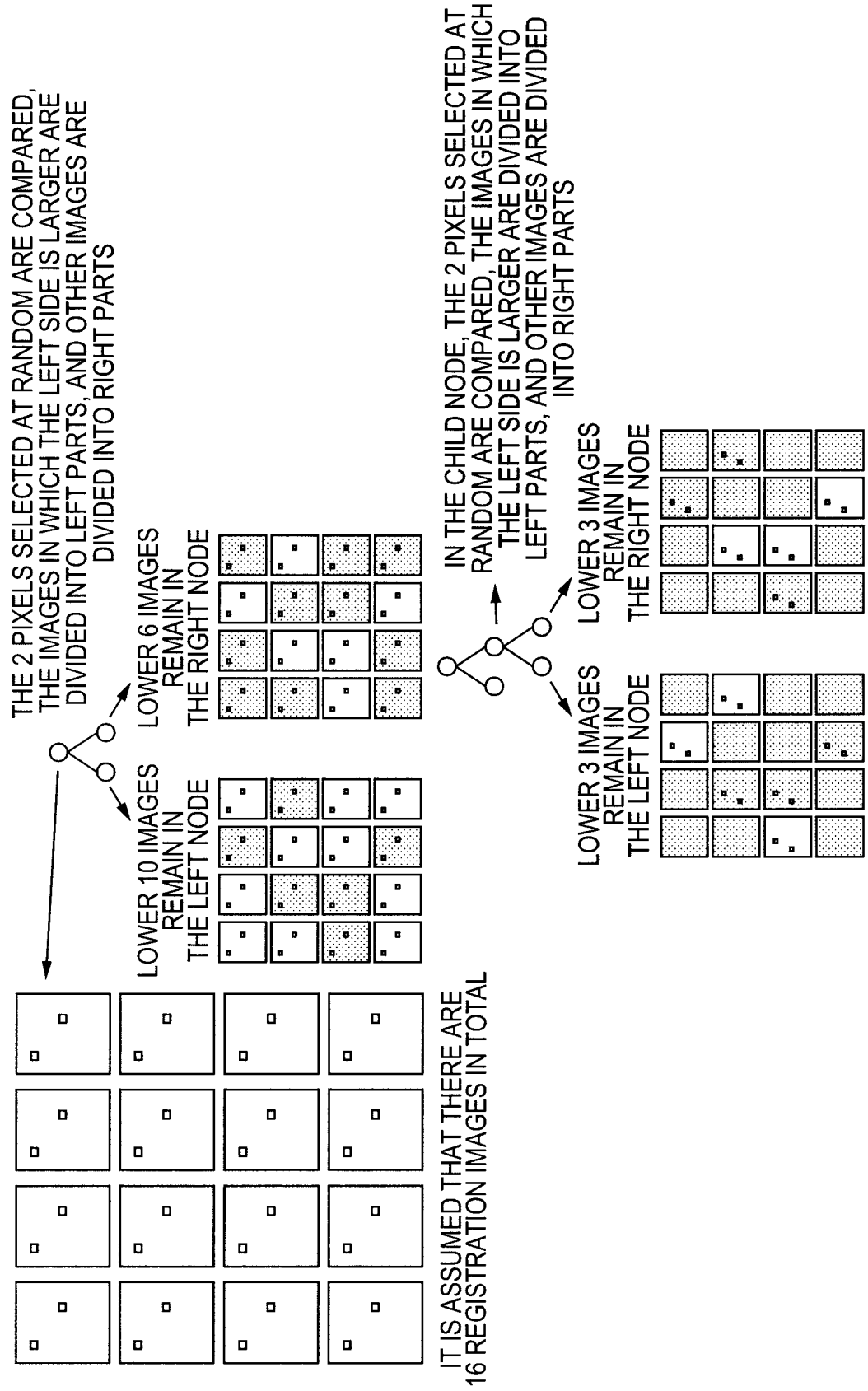
FIG. 8 is a diagram for describing a method of dividing a partial image set.

Assumed that the number of elements of the set of the registration partial images is equal to, for example, 16 (the number of registration partial images is equal to 16), 16 images written on the left side of FIG. 8 exist in the root node.

Two pixels are selected at random in the root node and all partial images included in the registration partial image set are divided into two sets by comparing their luminance. In the example of FIG. 8, 10 partial image remain in the left child node and 6 partial image remain in the right child node. The images illustrated in gray denote the images which did not remain.

Subsequently, in the right child node, if the return value of Stop_Split(S) of the subroutine 603 is FALSE, the further lower child node is developed. At this time, other two pixels are selected at random and their luminance is compared, thereby dividing the set.

In the example illustrated in FIG. 8, three elements remain in both of the left child node and the right child node.

Subsequently, the second embodiment will be described by using FIG. 9.

In the first embodiment, all of the partial images included in a certain registration image have been handled as images of the same class. In the second embodiment, all of them are handled as images of the different classes.

"Class" denotes a type of target to be discriminated in the machine learning and, ordinarily, indicates a type of registration image in the case of the image recognition. "All of the partial images included in a certain registration image are handled as images of the same class" mentioned above denotes that various kinds of partial image groups included in a certain registration image are handled as image groups of the same type although "appearances" differ. On the other hand, "All of the partial images included in a certain registration image are handled as images of the different classes" denotes that the partial images extracted from the different positions are handled as images of the different types although they are derived from the same registration image. Specifically speaking, by providing position information for the partial images, the partial images are distinguished one by one.

Assuming that there are N registration images and there are N partial images per registration image, there are M×N registration partial images in total and the number of classes is equal to N in the first embodiment. There are M×N registration partial images in total and the number of classes is equal to M×N in the second embodiment.

A specific example of the position information and its using method will be described by using FIG. 9.

Figure 9:
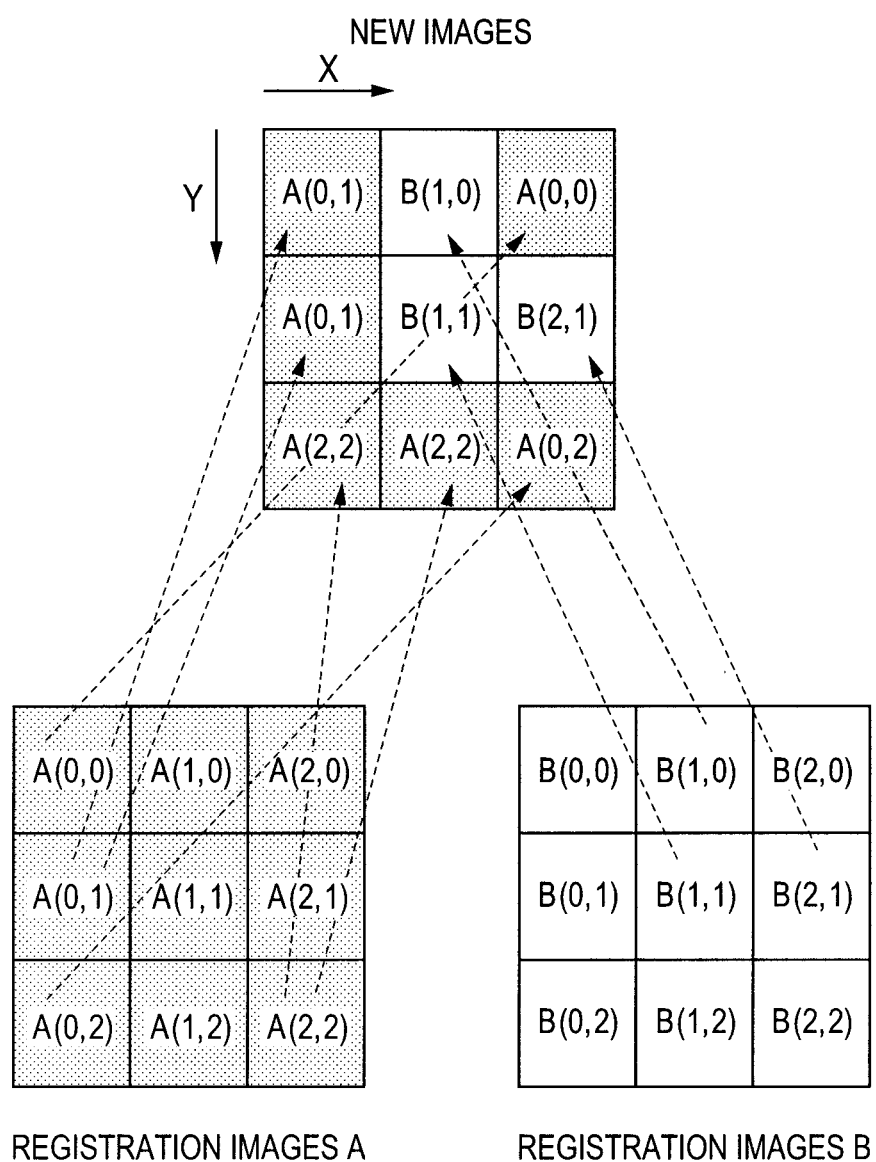
FIG. 9 is a diagram for describing a partial image result collecting step in a second embodiment.

In FIG. 9, it is assumed that there are two registration images of a registration image A and a registration image B and there are 3×3=9 non-overlapped partial images per registration image. Although the partial images overlap desirably in the embodiment, since generality is not lost even if they do not overlap, an example in which the partial images do not overlap will be described hereinbelow for simplicity of description.

Arrows of broken lines drawn in FIG. 9 indicate a combination of the most matched registration partial image and input partial image among the discrimination results 110 in FIG. 1 and the attribute discrimination results 306 in FIG. 3. There are nine new partial images and there are results of the matching with 18 (=9+9) registration partial images for each of them. Generally, as a result of the partial image attribute discrimination, class existence probabilities of 18 dimensions of (p1, p2, . . . , p18) are derived for each of the nine new partial images. However, for simplicity of description, a description is made on the assumption that the probability of the most matched partial image illustrated in the diagram is equal to 1 and the probabilities of the other partial images are equal to 0. The following discussion can be expanded to a general case by calculating a weight average by the probability vectors (p1, p2, . . . , p18).

As a result of the partial image attribute discrimination, the nine partial images of the new image are matched with the six partial images of A and the three partial images of B. When the number of accurately matched partial images is assumed to be a score, in the case of the first embodiment, a point of A is equal to 6, a point of B is equal to 3, and the new image is recognized as a registration image A.

However, when considering a definition of "accurately matched partial images" while also including the position information, a point of A is equal to 1, a point of B is equal to 3, and the new image is recognized as a registration image B. This is the simplest example of the second embodiment.

In this case, assuming that the correct recognition result of the new image is B eventually, the case of the first embodiment is wrong and the case of the second embodiment is a correct solution.

In the case of precisely calculating the score, the score may be calculated by using a function of a distance D between the position of the matched partial image and the position where the partial image should inherently be matched. For example, a function (evaluating expression) such as $\exp(-C*D)$, $\exp(-C*D*D)$, or $1/(1+C*D*D)$ (C is an arbitrary positive constant, exp is an exponential function) may be used.

A calculating expression in the case where $\exp(-C*D)$ is used for the score will be described hereinbelow. (For simplicity of description, it is assumed that D is an Euclidean distance on two dimensions and C=1).

As illustrated in FIG. 9, as for the new partial images and the partial images of the registration image A, they are matched with the six partial images of the registration image A among the nine new partial images. When distances on two dimensions from those positions are calculated, the distances from (left upper A(0,1)), (right upper A(0,0)), (left middle A(0,1)), (left lower A(2,2)), (middle lower A(2,2)), and (right lower A(0,2)) are equal to $\sqrt{1}$, $\sqrt{4}$, $\sqrt{0}$, $\sqrt{4}$, $\sqrt{1}$, and $\sqrt{4}$ (in this instance, the expression such as "left upper" denotes the position of the partial image in the new image, and the subsequent expression such as A(0,1) denotes a matching result corresponding thereto), respectively. Thus, the total score of A is equal to $e^{-\sqrt{1}}+e^{-\sqrt{4}}+e^{-\sqrt{0}}+e^{-\sqrt{4}}+e^{-\sqrt{1}}+e^{-\sqrt{4}}=1+2e^{-1}+3e^{-2}$.

As for the new partial images and the partial images of the registration image B, they are matched with the three partial images of the registration image B among the nine new partial images. When distances on two dimensions from those positions are calculated, the distances from (middle upper B(1,0)), (middle middle B(1,1)), and (right middle B(2,1)) are equal to $\sqrt{0}$, $\sqrt{0}$, and $\sqrt{0}$, respectively. Thus, the total score of B is equal to $e^{-\sqrt{0}}+e^{-\sqrt{0}}+e^{-\sqrt{0}}=3$.

Although the total score has been derived by adding the scores of the matched partial images in this example, the total score may be derived by multiplying them.

Figure 10A:
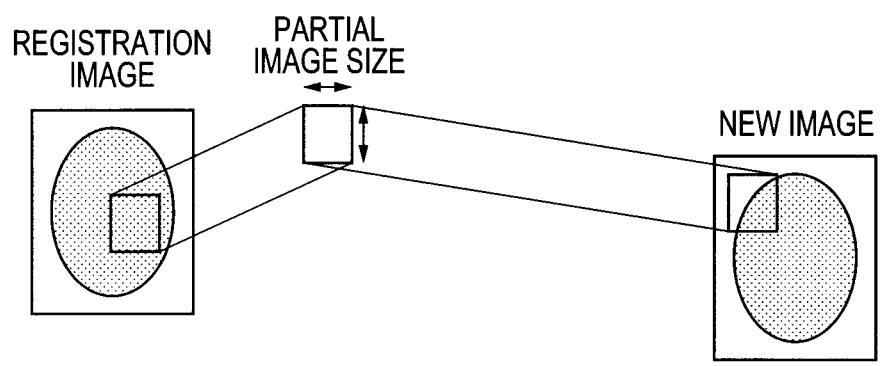
FIGS. 10A and 10B are diagrams for describing a third embodiment.
Figure 10B:
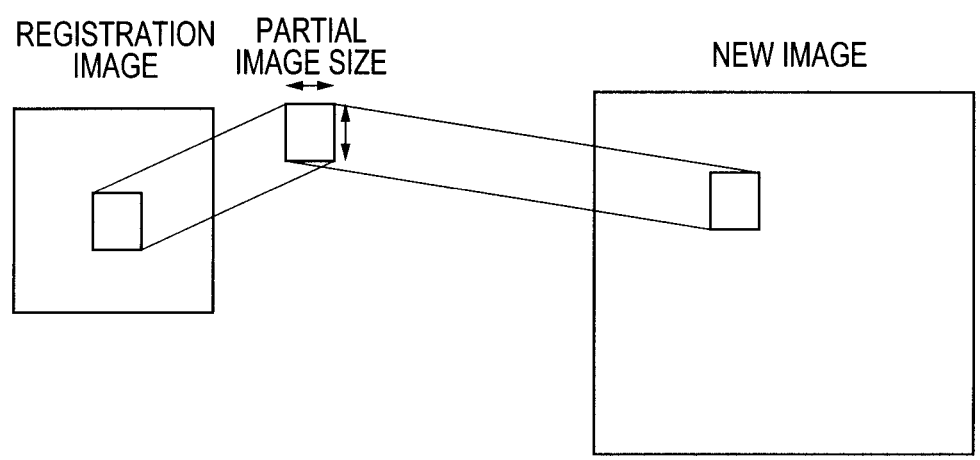

Subsequently, the third embodiment will be described by using FIGS. 10A, 10B and 11.

In the first and second embodiments, the registration images have the rectangular shapes. That is, all of the insides of the rectangles have been handled as registration images. However, generally, the inside of the rectangle of the registration image can be separated into a target and a background. For example, it is now assumed that a target illustrated in FIG. 10A has an elliptic shape in the registration image. In the third embodiment, all of the partial images in the registration image are not extracted in the registration partial image set extracting unit 104 in FIG. 1 but only the partial image in the ellipse where the target exists is extracted. Thus, only the image in the target can be extracted without extracting the background image.

A condition which is looser than such a condition that the partial image to be registered is completely included in the target can be also set. For example, such a condition that the partial image in which an area occupied by the target in the partial image is equal to 80% or more is extracted can be also set.

Figure 11:
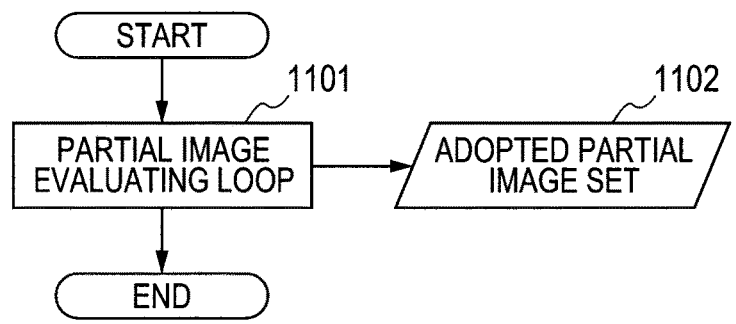
FIG. 11 is a flowchart for describing the third embodiment.

The above operation is illustrated as a flowchart in FIG. 11.

In a partial image evaluating loop 1101, all of the partial images included in the image are checked. As mentioned in the above example, for instance, only the partial image in which the area occupied by the target in the partial image is equal to 80% or more is added to an adopted partial image set 1102.

On the other hand, in the partial image attribute discriminating unit 109, also in the embodiment, a matching with an arbitrary partial image extracted from the new image is performed in a manner similar to the first and second embodiments. This is because since the target object included in the new image is unknown, which position of the new image should be seen is not preliminarily known.

The embodiment has been described on the assumption that the size of registration image and the size of new image are equal in the first and second embodiments. However, generally, the new image is larger than the registration image. Such a point is described in FIG. 10B.

For example, it is assumed that the size of registration image is equal to 100×100 and the size of partial image is equal to 20×20. In the first and second embodiments, since the size of new image is equal to the same size of 100×100 as that of the registration image, the number of partial images which are extracted in the new partial image set extracting unit 107 is equal to 6561 (=81×81).

On the other hand, in the embodiment, assuming that the size of new image is equal to 200×200, the number of partial images which are extracted in the new partial image set extracting unit 107 is equal to 32761 (=181×181).

A case where all of the registration images are extracted from the new image and matched (matching of the registration images by what is called "sliding window") is considered. Assuming that the size of registration image is equal to 100×100 and the size of new image is equal to 200×200, the matching is executed 10201 (=101×101) times. On the other hand, also in the case of using the foregoing partial images, the number of matching times is increased merely by about three times. Therefore, if a processing speed of the partial image attribute discriminating unit 109 is high (more accurately speaking, if the speed does not decrease in proportion to the number of registration images), the image recognition method in the embodiment using a very large number of registration partial images can be sufficiently suited to practical use.

Figure 12:
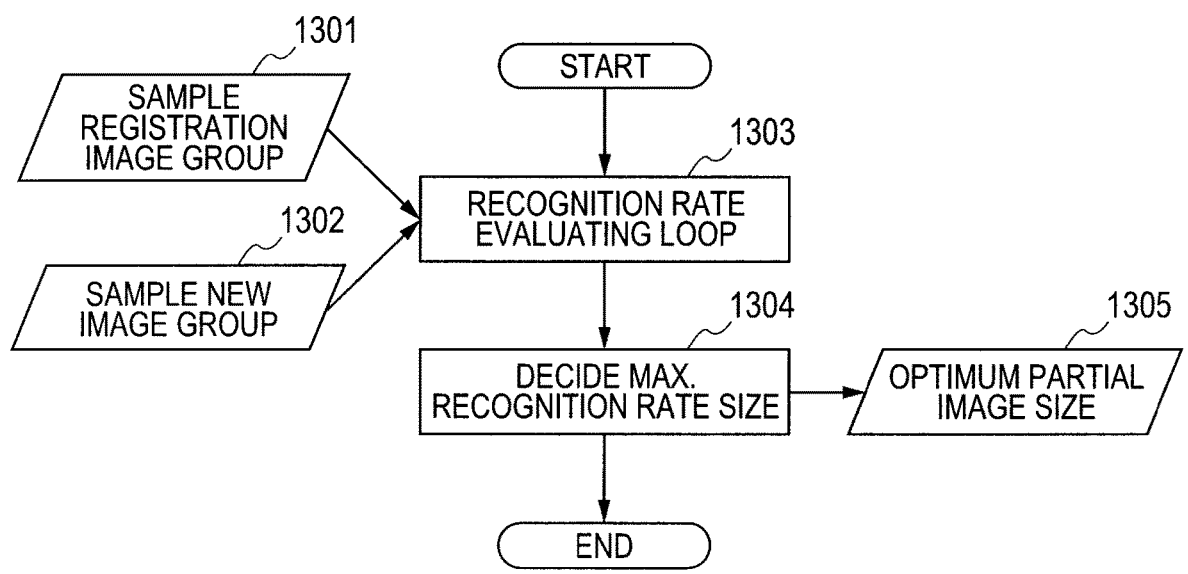
FIG. 12 is a flowchart for describing a partial image size deciding step in a fourth embodiment.

Subsequently, the fourth embodiment will be described by using FIGS. 12 and 13. In the fourth embodiment, an example in which the partial image size deciding unit 101 is practically installed. In the embodiment, the size of partial image is decided by using a method of what is called "cross validation".

The registration images 103 in FIG. 1 are classified into a sample registration image group 1301 and a sample new image group 1302 by a method, which will be described hereinafter. Although it is generally divided into two parts at random, it is also possible to construct in such a manner that assuming that there are N registration images 103, one of them is set to a sample new image (group), and other images are set to a sample registration image group. (This is called "leave one out method". In this case, an evaluation of a recognition rate is performed by an average of values of the recognition rates obtained by circulating the sample new image N times and a recognition rate evaluating loop 1303 is executed {N×(the number of kinds of sizes of the partial images which are evaluated)}times.)

First, the size of partial image is temporarily decided to a certain size, the sample registration image group 1301 is set to the registration images 103, and the learning is performed. The learning is performed in the learning unit 302. Subsequently, each image of the sample new image group 1302 is set to the new image 106 one by one and the image is recognized. By collecting the recognition results 112 obtained from all of the new image groups, the recognition rate in the case where the partial images have a predetermined size is obtained.

Figure 13:
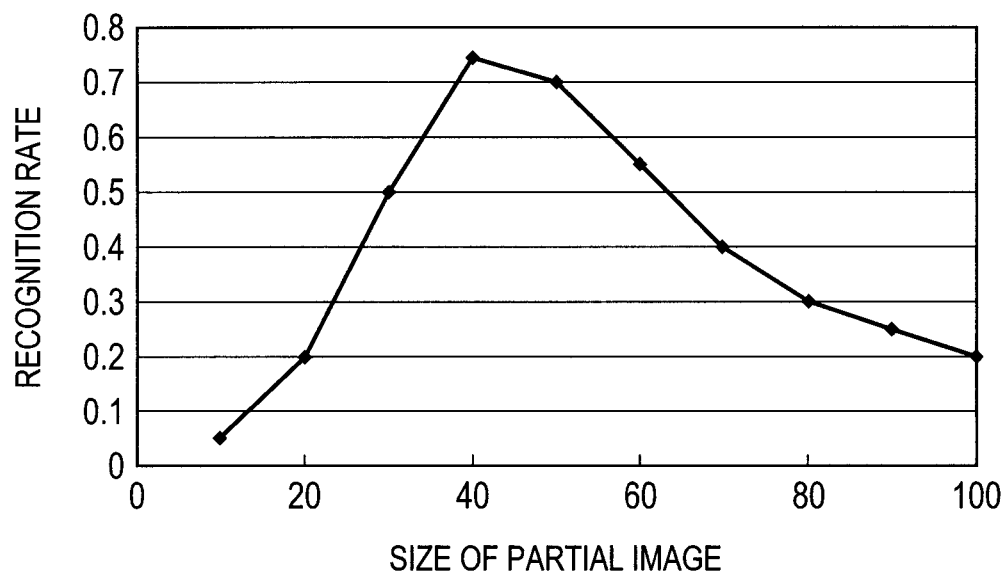
FIG. 13 is a diagram for describing a size evaluating method in the partial image size deciding step in the fourth embodiment.

FIG. 13 is a graph obtained by plotting a difference of the recognition rates at the time when the size is varied. An axis of abscissa indicates a partial image size and an axis of ordinate indicates an average recognition rate evaluated at the size.

In this example, since the partial image size has a peak at the size of 40, 40 is selected in a maximum recognition rate deciding step 1304 and an optimum partial image size 1305 is equal to 40. It is an important point in the embodiment that the partial image size is evaluated by using the image recognition method mentioned in the first to third embodiments.

Subsequently, the fifth embodiment will be described by using FIGS. 14 and 15.

Although the cross validation method mentioned in the fourth embodiment has such an advantage that the partial image size of high recognition performance can be determined, such a disadvantage that very large computer costs are necessary also exists. In the embodiment, an example of the simpler process of the partial image size deciding unit 101 will be described.

Figure 14:
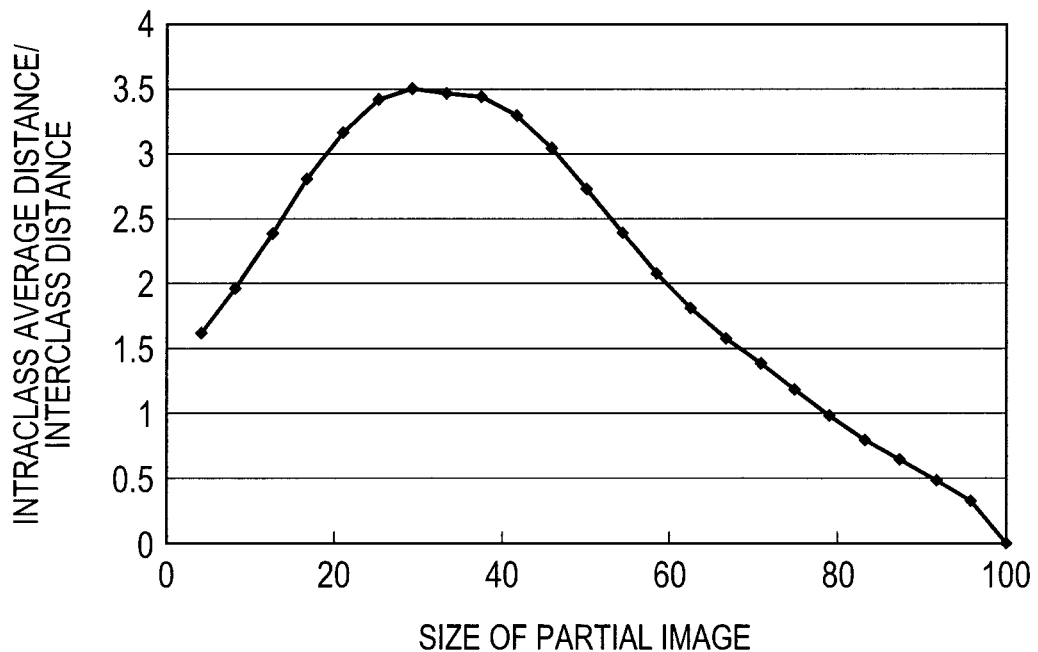
FIG. 14 is a diagram for describing a size evaluating method in the partial image size deciding step in a fifth embodiment.

FIG. 14 is a graph obtained by properly selecting two registration images belonging to the different classes from the registration images 103 in FIG. 1 and analyzing a structure between their partial image groups. (Hereinbelow, "class" denotes a type of registration image. For example, the image of the class A is a face image of Mr. A and the image of the class B is a face image of Mr. B.)

In the graph of FIG. 14, an axis of abscissa indicates a size of partial image and an axis of ordinates indicates (intraclass average distance/interclass distance). The intraclass average distance and the interclass distance will be described by using FIG. 15.

Figure 15:
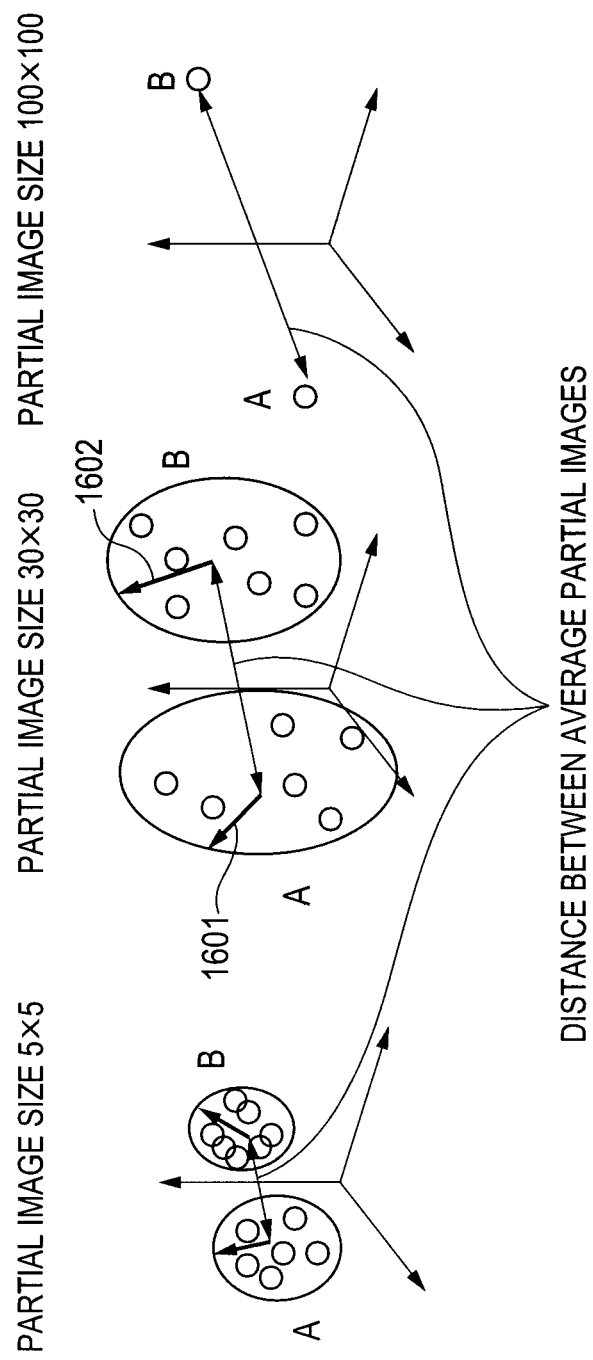
FIG. 15 is a diagram schematically illustrating a method of the operation of the partial image size deciding step in the fifth embodiment.

Although a characteristics space is illustrated like a 3-dimensional space in FIG. 15, it is illustrated for convenience of description. Actually, the characteristics space is an extremely high-dimensional space. More specifically speaking, it is a space of the dimensions of the number as many as the number of pixel sizes of the partial image. "Distance" which will be used in the following description denotes a Euclidean distance. The embodiment is not limited to the Euclidean distance but an arbitrary distance scale can be used.

For example, it is assumed that a size of registration image 103 is equal to 100×100. It is also assumed that there are two images of the class A and class B. Assuming that a size of partial image is a full size of 100×100, the number of registration partial images is equal to 1 for each class. They are arranged in a space layout on the right side in FIG. 15. The number of dimensions here is equal to 10000 (=100×100). In the following description, ○ in FIG. 15 denotes one partial image. As for the layout of the class A and class B, a description will be made on the assumption that the left side shows the class A and the right side shows the class B for convenience of description.

"Intraclass average distance" denotes an average of distances between an average partial image of the class and the respective partial images. In this case, since there is only one partial image, the average partial image of the class becomes the "registration image itself" and the intraclass average distance is equal to 0.

"Interclass distance" denotes a distance between the average partial images of the class (=between the two registration images). In the case of the right side in FIG. 15, it indicates a length of lateral arrow.

Eventually, (intraclass average distance/interclass distance) as an axis of ordinates in FIG. 14 is equal to 0 since its numerator is equal to 0.

When the "intraclass average distance" and "interclass distance" are described by using numerical expressions, they are as follows.

It is assumed that a vector of the partial image is expressed by $I_{x,y}^i$ (i: index of the partial image, x, y: coordinates, I: pixel value (real number) of the coordinates).

Thus, an average partial image (vector) $\bar{I}_{x,y}^i$ is defined by $$\frac{1}{N}\sum_{i=1}^{N} I_{x,y}^i,$$

where N is the number of partial images.

The intraclass average distance (scalar) is defined by $$\frac{1}{N}\sum_{i=1}^{N} d^i, \quad d^i = \frac{1}{XY}\sqrt{\sum_{\substack{1<=x,<=X \\ 1<=y<=Y}} (I_{x,y}^i - \bar{I}_{x,y}^i)^2},$$

where X and Y are lateral size and vertical size of the image, respectively.

The interclass distance is defined by $$D = \frac{1}{XY}\sqrt{\sum_{\substack{1<=x,<=X \\ 1<=y<=Y}} (\overline{I(A)}_{x,y}^i - \overline{I(B)}_{x,y}^i)^2},$$

where A and B are class names.

Subsequently, a partial image size of 30 at which the index of the graph of FIG. 14 indicates a peak will be described. When the size of partial image reaches 30×30, the number of partial images of each of the classes A and B is equal to 5041 (=71×71) and the number of dimensions is equal to 900 (=30×30).

A diagram illustrated at the center of FIG. 15 is a space of 900 dimensions and this diagram illustrates how the partial images are distributed. Accurately describing, although the number of ○ with respect to each of the classes A and B ought to be equal to the number (=5041) of partial images, most of them are omitted here because they cannot be fully illustrated.

Two bold arrows 1601 and 1602 indicate "intraclass average distance". Specifically speaking, as described above, it is defined by "average of distances between an average partial image of the class and the respective partial images". The "intraclass average distance" which is used in the index is set to an average of the intraclass average distance 1601 of the class A and the intraclass average distance 1602 of the class B.

As illustrated at the center of FIG. 15, when the number of partial images is large to a certain extent, its distribution spreads and the intraclass average distance increases. In FIG. 15, "degree of expanse of the class" is expressed by a large ellipse surrounding the partial images shown by ○.

Although the "interclass distance" (length of arrow in the lateral direction) is smaller than that in the case of 100×100 on the right side in FIG. 15, the final index (intraclass average distance/interclass distance) is larger.

When the size of partial image is further reduced (5×5), they have a space layout as illustrated on the left side in FIG. 15. The number of dimensions is equal to 25 (=5×5) and the number of partial images of each of the classes A and B is equal to 9216 (=96×96).

Although the "interclass distance" is further shortened, the "intraclass average distance" decreases more than it, so that the index (intraclass average distance/interclass distance) decreases. This means that although the number of partial images increases, its distribution range decreases relatively. This corresponds to a case where a character of the distribution of the partial images is extinguished and it becomes difficult to distinguish the partial image group of A from the partial image group of B.

The partial image size evaluating method using (intraclass average distance/interclass distance) described above is a concept which is liable to be confused with what is called "separating function of Fisher". However, there is a reverse relation between the foregoing index and that of the separating function of Fisher. That is, the separating function of Fisher intends to decrease the distribution range in the class as much as possible and to increase the distribution range between the classes as much as possible. On the contrary, the index (intraclass average distance/interclass distance) described in the embodiment becomes such an index as to decrease the distribution range between the classes as much as possible and to increase the distribution range in the class as much as possible.

Since the nature that is substantially opposite to that of the separating function of Fisher is seen according to such an index, in the ordinary feeling, when the index is large, it is felt as if the recognition rate decreased. However, according to the image recognition method using the partial images of the invention, when the index is large, this means that a form of set of the partial images has a sufficient meaningful structure (distribution) and such a phenomenon that the recognition rate rises eventually (experientially) occurs.

The sixth embodiment will be described hereinbelow by using FIGS. 16 to 19.

Figure 18A:
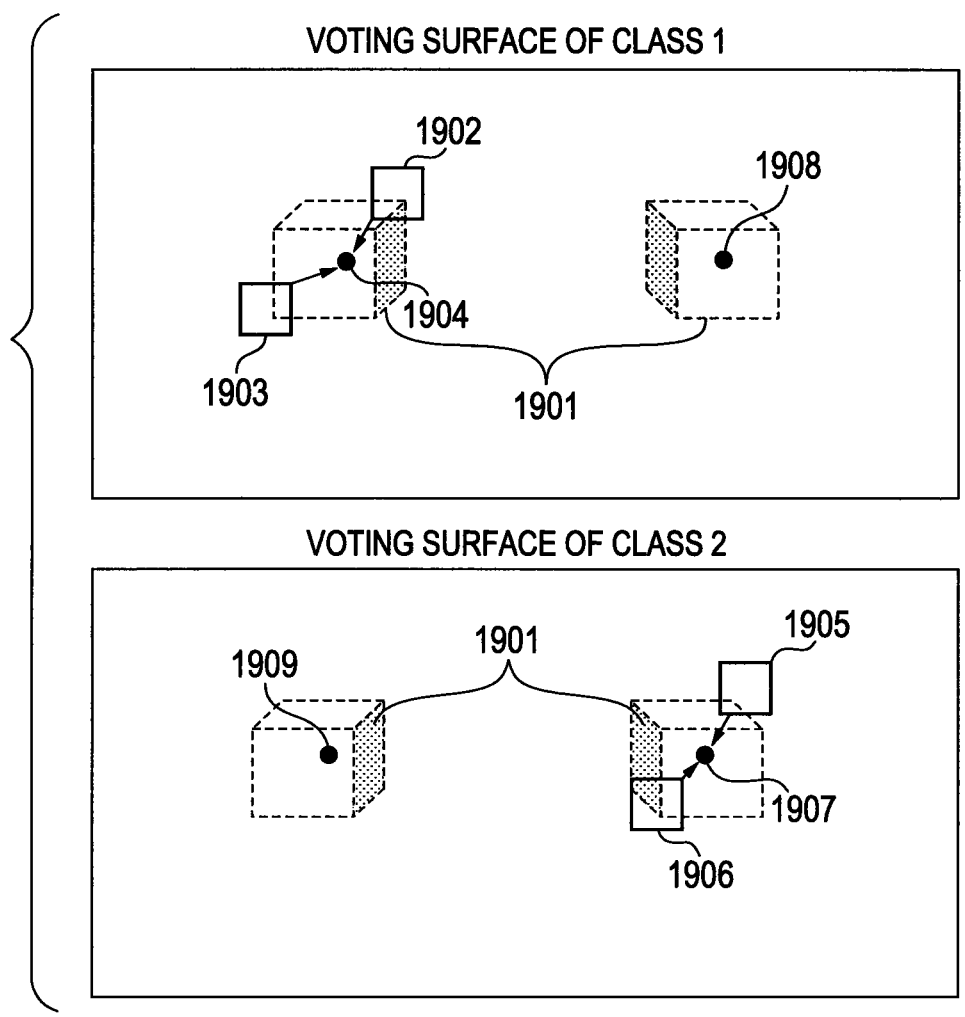
FIGS. 18A and 18B are diagrams for describing a voting method in the sixth embodiment.
Figure 18B:
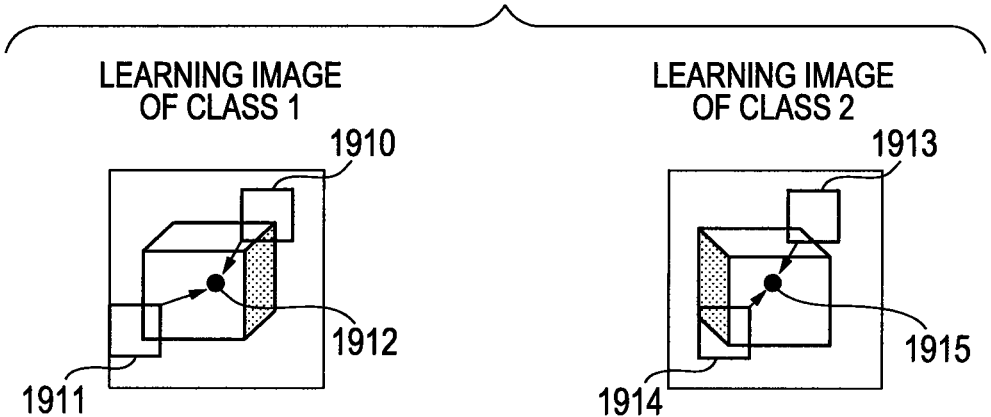

In the sixth embodiment, a technique in which images obtained by photographing a target object from various directions are learned as registration images and the target object is detected from the input images including the target object is realized. A learning step (302 in FIG. 4) in the sixth embodiment is fundamentally the same as that in the second embodiment. That is, N images obtained by photographing one target object from N orientation directions are used as N registration images in FIG. 8. For example, images as illustrated in FIG. 18B are obtained. A plurality of partial images are extracted from them and set as registration partial images.

Ordinarily, those N orientation directions become orientation directions in which the directions directing from points arranged at regular intervals on a geodesic dome toward the center of the object are multiplied by an inplane rotation of the camera or image. By preparing the registration images as mentioned above, even if the target object has been photographed at which orientation in the input image, it can be recognized and detected. Such an operation that the matching of the N registration images is performed by the machine learning is equivalent to such an operation that the discrimination of N classes is made. A description will be made hereinbelow on the assumption that the N registration images and the N orientation classes are identified.

Images obtained by artificially photographing the target object from various directions from, for example, a CAD image may be formed by using a technique of computer graphics. Although the embodiment has been described on the assumption that there is one target object, even if there are a plurality of target objects, its essence does not change.

The more the number of orientation classes is increased, the orientation can be discriminated in more detail. That is, in order to realize high resolution with respect to the orientation, it is necessary to set the number N of registration images to an enough large value. However, even if a description will be made by assuming N=2, its essence does not change. Therefore, it is assumed that N=2 hereinbelow for simplicity of description. The target object is a rectangular parallelepiped as illustrated in FIG. 18B. It is assumed that the two (=N) orientation classes are set to the orientation facing to the front right and the orientation facing to the front left as illustrated in FIG. 18B. In order to realize high object recognition and detecting performance, it is also necessary to set the number (M) of partial images to a certain large value. However, even if a description will be made by assuming M=2, since its essence does not change, it is assumed that M=2 hereinbelow for simplicity of description. Specifically speaking, it is assumed that registration partial images in the orientation classes are images 1910 and 1911 in the class 1 and are images 1913 and 1914 in the class 2 as illustrated in FIG. 18B, respectively. In FIG. 18B, a center position of the target object in the registration image is shown by 1912 in the class 1 and by 1915 in the class 2.

Figure 16:
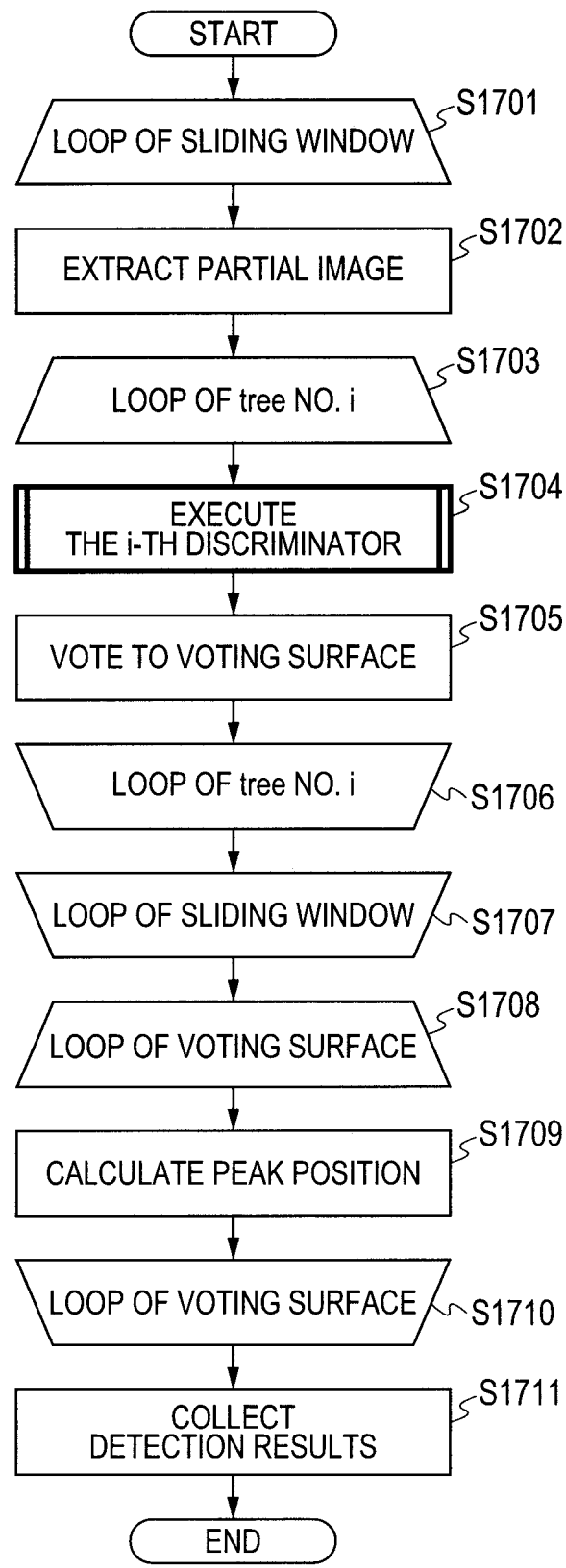
FIG. 16 is a flowchart illustrating a processing procedure in a sixth embodiment.

A step of detecting the object will now be described. FIG. 16 is a diagram illustrating a flowchart for an object detecting routine in the sixth embodiment. In the object detecting step, first, while sliding a window by the image which has newly been input, a routine for processing a partial image existing in the window is executed. This loop is a loop of S1701 to S1707. This state corresponds to the same operation as that in FIG. 10B used in the description of the third embodiment.

For example, it is assumed that a size of registration image is equal to 100×100 and a size of partial image is equal to 20×20. Assuming that a size of new image is equal to 200×200, the number of partial images which are extracted in an partial image extracting step in S1702 (the same as new partial image set extracting step S107 in FIG. 2B) is equal to 32761 (=181×181). In is also possible to construct in such a manner that all of the 32761 (=181×181) partial images are not processed in the loop of S1701 to S1707 but a proper number of partial images among them are sampled, thereby realizing a high speed.

In this loop, the extraction of the partial images is first executed (S1702) and the extracted partial images are input, thereby obtaining discrimination results of the L classification tree discriminators. This loop is a loop of S1703 to S1706. A step of allowing the extracted partial images to be recognized to the respective classification trees is S1704. A flowchart of details of such a step is illustrated in FIG. 17.

Figure 17:
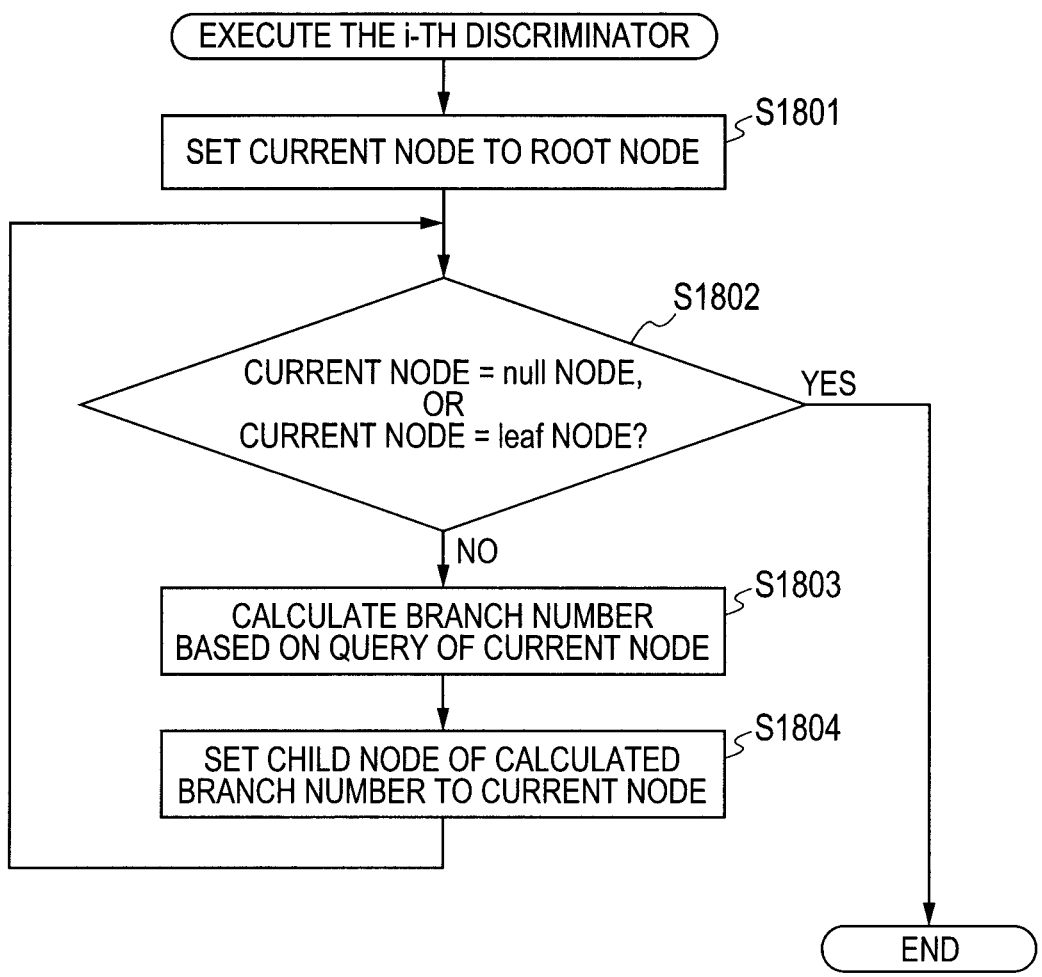
FIG. 17 is a flowchart illustrating a recognition processing procedure by a classification tree in the sixth embodiment.

The flowchart illustrated in FIG. 17 describes a step of tracing the classification tree from a root node to a leaf node or a null node. It is defined that the node to which attention is paid at present in the classification tree is a current node. First, the root node is set to the current node (S1801). Subsequently, whether or not the current node is the null node or the leaf node is discriminated (S1802). If the current node is the null node or the leaf node, the present subroutine is finished.

Information stored in the leaf node is a set of information showing "partial image at which position of which registration image". More specifically speaking, it is a group of "class numbers and offsets from a reference position". (Details of the offset will be described hereinafter by using FIGS. 18A and 18B.)

If the current node is none of the null node and the leaf node, a branch number is calculated based on a query of the current node (S1803). A child node of the calculated branch number is set into the current node (S1804). The step described above is a general and universal step in the recognizing step using the classification tree.

Returning to FIG. 16, a vote is performed by using the recognition result of the i-th discriminator (classification tree) (S1705). This state will be described by using FIGS. 18A, 18B and 19. A state of the vote is illustrated in FIG. 18A. A state of the learning image is illustrated in FIG. 18B. Since the number of registration images, that is, the number of classes is equal to 2, the number of voting surfaces (2-dimensional sheet) illustrated in FIG. 18A is equal to 2. Specific contents of the voting surface are a 2-dimensional table in which scores of the votes are added. A location showing a large value in this table denotes a location where a possibility in which the object of such a class exists is high.

Although two rectangular parallelepipeds (1901) drawn by broken lines are displayed in the diagram of FIG. 18A, this means that the two rectangular parallelepipeds are reflected in the input image. Since FIG. 18A merely illustrates the voting surface, by drawing the image by the broken line, it is expressed that it is not the input image itself. (It should be noted that the two rectangular parallelepipeds 1901 are drawn at the same position of two voting surfaces of the class 1 and class 2 in FIG. 18A.)

Reference numeral 1902 in FIG. 18A denotes "one certain" partial image which was cut out when a partial image frame has been slid, that is, the loop of steps S1701 to S1707 in FIG. 16 has been executed. It is assumed that as a result of the recognition of the partial image 1902, it is matched with the partial image 1910 of the registration image of the class 1 (FIG. 18B). Thus, a positional relation (offsets to the center position) between the partial image 1910 and the partial image 1912 in FIG. 18B are read out (this information has been stored in the lead node described in FIG. 17). A vote is performed from a position of the partial image 1902 to a position of a point 1904 on the voting surface of the class 1.

Similarly, a vote to the point 1904 on the voting surface is also performed from a recognition result of a partial image 1903. A vote to a point 1907 on the voting surface of the class 2 is performed from a recognition result of a partial image 1905. A vote to the point 1907 is also performed from a recognition result of the partial image 1906.

As described above, the vote to the voting surface in step S1705 denotes "vote to an object center position on the class voting surface of the registration image similar to the partial image in the input image".

Figure 19:
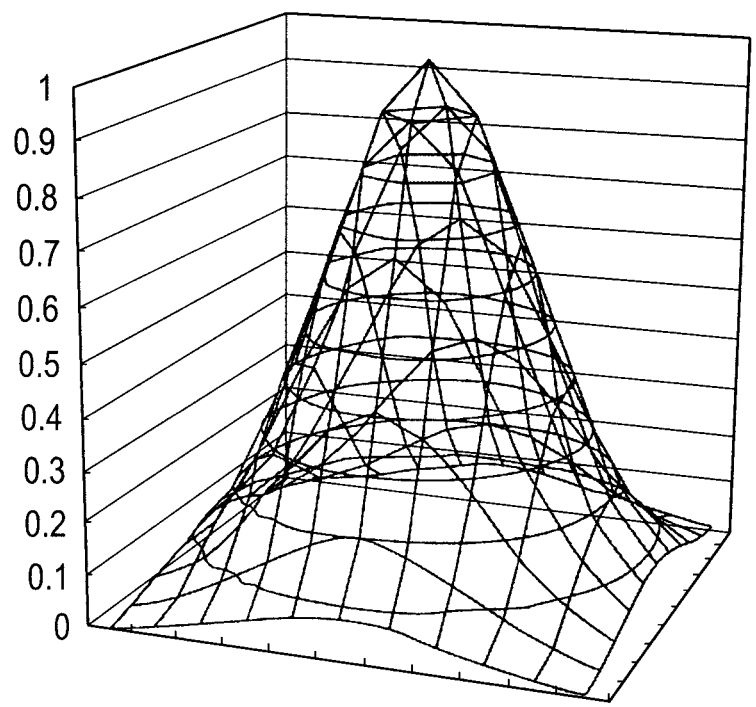
FIG. 19 is a diagram for describing weight distribution at the time of voting in the sixth embodiment.

Although FIGS. 18A and 18B have been described on the assumption that the vote is performed to one point of the object center for simplicity of description, ordinarily, the vote may be performed so as to be distributed to a wide area as illustrated in FIG. 19. For example, in FIG. 19, a bottom surface is constructed by two dimensions of x and y (two dimensions of x and y have the same meaning as the vertical and lateral two dimensions of the voting surface) and a height indicates a weight of vote. When expressing by an equation, a bell-shaped function of.

value=$e^{-(dx*dx+dy*dy)}$, where dx and dy are distances from the center, is used. Generally, the invention is not limited to such a function but any function may be used so long as it is a bell-shaped function. A distribution function such as uniform interval distribution may be used.

Although the method of voting to the object center has been described in FIGS. 18A and 18B, it is not always necessary to vote to the object center. That is, a plurality of reference positions are set to a 3-dimensional model of the target object and the voting surface as illustrated in FIG. 18A may be prepared every reference position.

Although the example illustrated in FIGS. 18A and 18B relate to the vote to one position or area with respect to one partial image, in the case where the information stored in the leaf node mentioned in FIG. 17 is the partial images at a plurality of positions of a plurality of classes, the vote is performed to the voting area of each class.

The vote described in FIGS. 18A and 18B are the vote only to the voting surface of the matched class. That is, the partial images 1902 and 1903 were voted onto the voting surface of the class 1 because they are matched with the partial image of the class 1. Likewise, the partial images 1905 and 1906 were voted onto the voting surface of the class 2 because they are matched with the partial image of the class 2. However, the class 1 and the class 2 are not the quite different categories but have a meaning of different orientations of the same rectangular parallelepiped (target object). Therefore, a vote to a point 1909 on the voting surface of the class 2 may be performed from the recognition results of the partial images 1902 and 1903. Similarly, a vote to a point 1908 on the voting surface of the class 1 may be performed from the recognition results of the partial images 1905 and 1906.

When the above processes will be generally described, it is now assumed that there are N classes and similarity degrees of all pairs of them or their distances are previously calculated. A vote to the voting surfaces of the similar classes in which distances are equal to a predetermined threshold value or less is performed by a size corresponding to the distances. For example, assuming that a distance between the classes is equal to D, the vote corresponding to the distances denotes the vote multiplied by a coefficient as shown by Exp (−D). (Assuming that the distance between the same classes is equal to 0, it should be noted that such a coefficient is equal to 1). Ordinarily, although the distance between the orientation classes is obtained by an angle of rotation of RODRIGUES rotation, the invention is not particularly limited to it.

When the loop of steps S1701 to S1707 in FIG. 16 is finished, the vote to each voting surface illustrated in FIG. 18A is finished and intensity distribution of each voting surface is obtained. Eventually, distribution in which the target object in each class, that is, in each orientation direction exists is obtained. The orientation direction and position of a part are decided from such information and an example in such a case will be described hereinbelow.

A position where a peak appears on the voting surface of each class in a loop of S1708 to S1710 is calculated (S1709). Thus, the location where a possibility that each of the N orientation classes exists is highest and its score are obtained. Specifically speaking, in the case of FIGS. 18A and 18B, the point 1904 is selected as a peak on the voting surface of the class 1 and the point 1907 is selected as a peak on the voting surface of the class 2.

By sorting the results of the N orientation classes, the voting results are collected (S1711). By a result of the collection, the object in the orientation direction in which an existence possibility is high in the input image and its position can be identified. Specifically speaking, in the case of FIGS. 18A and 18B, assuming that a value of the point 1904 is larger than that of the point 1907, as a first candidate of a result of the identification, the position in the orientation class 1 is set to 1904, and as a second candidate, the position in the orientation class 2 is set to 1907.

The method described in FIG. 16 is one example of collecting methods and any process may be executed so long as the orientation directions of the target object and its position can be identified. For example, a plurality of local peaks on the voting surface of each class may be calculated and collected. For instance, in the case of FIGS. 18A and 18B, besides the points 1904 and 1907, the points 1908 and 1909 may be included in candidate points and collected. Thus, for example, it is assumed that the points are arranged like 1904, 1908, 1907, and 1909 in order from the largest score. Consequently, the object of the orientation class 1 is detected at two positions of 1904 and 1908.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer or a system or apparatus by, for example, reading out and executing a program recorded on a memory device to perform the functions of the above-described embodiments. For this purpose, the program is provided to the computer for example via a network or from a recording medium of various types serving as the memory device (e.g. computer-readable medium).

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims priority from Japanese Patent Application No. 2009-145457, filed Jun. 18, 2009, and Japanese Patent Application No. 2010-064316, filed Mar. 19, 2010, which are hereby incorporated by reference herein in their entirety.

The invention claimed is:

1. An apparatus for processing an image including a target object, comprising:
   one or more processors; and
   at least one memory coupled to the one or more processors, the at least one memory having stored thereon instructions which, when executed by the one or more processors, cause the apparatus to:
   obtain a plurality of partial target images from a target image including the target object;
   discriminate a feature of each of the plurality of partial target images;

estimate, for each of the plurality of partial target images, a class of the target object and a position of the target object in the target image, by referring to a dictionary based on the discriminated feature and a position of each of the plurality of partial target images, wherein in the dictionary, for a plurality of partial learning images obtained by dividing respective one of a plurality of learning images each including the target object, a feature of each partial learning image is registered in correspondence with a class of the target object included in a learning image which contains the partial learning image;

vote, with respect to each of the plurality of partial target images, for a combination of the estimated class of the target object and the estimated position of the target object in the target image; and recognize the class of the target object and the position of the target object in the target image by aggregating results of the voting for the plurality of partial target images.

2. The apparatus according to claim 1, wherein the position of the target object represents information on a relative position between the target object and the partial learning image in the learning image.

3. The apparatus according to claim 1, wherein the target image is a grey-scale image.

4. The apparatus according to claim 1, wherein the dictionary comprises a plurality of tree-structured discriminators.

5. The apparatus according to claim 1, wherein in discriminating the feature of each of the plurality of partial target images, pixel values of pairs of pixels are acquired from pixels in predetermined positions of each of the plurality of partial target images, and the feature of each of the plurality of partial target images is discriminated by comparing pixel values of respective pairs of pixels in the predetermined positions.

6. The apparatus according to claim 5, wherein an acquiring process and a comparing process of pixel values are repeated.

7. The apparatus according to claim 6, wherein positions where the pixel values are acquired from each of the plurality of partial target images are changed every time the acquiring process and the comparing process are repeated.

8. The apparatus according to claim 1, wherein the plurality of partial images overlap each other.

9. The apparatus according to claim 1, wherein the target image includes a plurality of the target objects.

10. The apparatus according to claim 1, wherein the plurality of the partial target images are obtained by shifting a predetermined partial image.

11. The apparatus according to claim 5, wherein each of the pixel values indicates luminance.

12. The apparatus according to claim 1, wherein the class of the target object and the position of the target object included in the target image are recognized based on the distribution of the result of the voting.

13. The apparatus according to claim 1, wherein the voting for the combination of the estimated class of the target object and the estimated position of the target object is performed by voting at a position corresponding to the estimated position of the target object in a voting surface corresponding to the estimated class, where each of a plurality of voting surfaces is provided for respective one of a plurality of classes of the target object, and.

wherein in recognizing the class of the target object and the position of the target object in the target image, the results of the voting in each of the voting surfaces for the plurality of partial target images are aggregated.

14. The apparatus according to claim 1, wherein the instructions which, when executed by the one or more processors, further cause the apparatus to:

register in the dictionary, for the plurality of partial learning images, the feature of each partial learning image in correspondence with the class of the target object and the position of the each partial learning image relative to the target object.

15. The apparatus according to claim 1, wherein the class of the target object includes an orientation of the target object.

16. The apparatus according to claim 13, wherein in recognizing the class and the position, a score of a peak position in the distribution of the result of the voting is acquired, and one of the classes that corresponds to a voting surface having a peak position with the highest score is recognized as the class of the target object.

17. The apparatus according to claim 13, wherein the voting surface is formed with a multi-dimension table.

18. The apparatus according to claim 13, wherein the voting surface is formed with a two-dimensional table having elements corresponding to the respective pixels of the target image.

19. A method of processing an image including a target object, comprising:

obtaining a plurality of partial target images from a target image including the target object;

discriminating a feature of each of the plurality of partial target images;

estimating, for each of the plurality of partial target images, a class of the target object and a position of the target object in the target image, by referring to the dictionary based on the discriminated feature and a position of each of the plurality of partial target images, wherein in the dictionary, for a plurality of partial learning images obtained by dividing respective one of a plurality of learning images each including the target object, a feature of each partial learning image is registered in correspondence with a class of the target object and a position of the each partial learning image relative to the target object included in a learning image which contains the partial learning image;

voting, with respect to each of the plurality of partial target images, for a combination of the estimated class of the target object and the estimated position of the target object in the target image; and recognizing the class of the target object and the position of the target object in the target image by aggregating results of the voting for the plurality of partial target images.

20. A non-transitory computer-readable storage medium storing a computer program for causing a computer to execute a method of processing an image including a target object, the method comprising:

obtaining a plurality of partial target images from a target image including the target object;

discriminating a feature of each of the plurality of partial target images;

estimating, for each of the plurality of partial target images, a class of the target object and a position of the target object in the target image, by referring to the dictionary based on the discriminated feature and a position of each of the plurality of partial target images, wherein in the dictionary, for a plurality of partial learning images obtained by dividing respective one of a plurality of learning images each including the target object, a feature of each partial learning image is registered in correspondence with a class of the target object and a position of the each partial learning image relative to the target object included in a learning image which contains the partial learning image;

voting, with respect to each of the plurality of partial target images, for a combination of the estimated class of the target object and the estimated position of the target object in the target image; and recognizing the class of the target object and the position of the target object in the target image by aggregating results of the voting for the plurality of partial target images.

* * * * *